US012272882B2

(12) United States Patent
Yu et al.

(10) Patent No.: US 12,272,882 B2
(45) Date of Patent: Apr. 8, 2025

(54) DIRECTIONAL ANTENNA AND COMMUNICATION DEVICE

(71) Applicant: HUAWEI TECHNOLOGIES CO., LTD., Shenzhen (CN)

(72) Inventors: Min Yu, Chengdu (CN); Xin Luo, Chengdu (CN); Yuping Shu, Shenzhen (CN); Yi Chen, Chengdu (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 340 days.

(21) Appl. No.: 17/701,802

(22) Filed: Mar. 23, 2022

(65) Prior Publication Data

US 2022/0216606 A1 Jul. 7, 2022

Related U.S. Application Data

(63) Continuation of application No. PCT/CN2020/116346, filed on Sep. 19, 2020.

(30) Foreign Application Priority Data

Sep. 27, 2019 (CN) ........................ 201910927624.0

(51) Int. Cl.
*H01Q 3/44* (2006.01)
*H01Q 1/38* (2006.01)
(Continued)

(52) U.S. Cl.
CPC ............... *H01Q 3/44* (2013.01); *H01Q 5/314* (2015.01); *H01Q 15/14* (2013.01); *H01Q 19/10* (2013.01);
(Continued)

(58) Field of Classification Search
CPC .. H01Q 1/38; H01Q 1/48; H01Q 3/36; H01Q 3/44; H01Q 5/314; H01Q 15/14; H01Q 19/10
See application file for complete search history.

(56) References Cited

U.S. PATENT DOCUMENTS 6,191,751 B1 2/2001 Johnson
2003/0231138 A1 12/2003 Weinstein
(Continued)

FOREIGN PATENT DOCUMENTS

CN 102255139 A 11/2011
CN 102544721 A 7/2012
(Continued)

OTHER PUBLICATIONS

Zhang Jihua, "Design of Directional Wideband/Multi-band Wireless Communication Antennas", Xidian University, Jun. 2018, with an English abstract, total 66 pages.
(Continued)

*Primary Examiner* — Hoang V Nguyen
*Assistant Examiner* — Amal Patel
(74) *Attorney, Agent, or Firm* — Rimon PC

(57) ABSTRACT

A directional antenna and a communication device are provided in this disclosure. The directional antenna includes a first element, a second element and a first reflector. An operating frequency band of the first element is a first frequency band, and an operating frequency band of the second element is a second frequency band. An equivalent electrical length of the first reflector is equal to or slightly greater than one half of the wavelength of the first frequency band. The first reflector includes a first resonant circuit, the first resonant circuit includes a first capacitive part and a first inductive part that are connected in parallel. A resonance frequency of the first resonant circuit is within the second frequency band, and an equivalent electrical length of any part other than the first resonant circuit in the first reflector is less than one half of the wavelength of the second frequency band.

20 Claims, 24 Drawing Sheets

(51) Int. Cl.

| | |
|---|---|
| ***H01Q 1/48*** | (2006.01) |
| ***H01Q 3/36*** | (2006.01) |
| ***H01Q 5/314*** | (2015.01) |
| ***H01Q 15/14*** | (2006.01) |
| ***H01Q 19/10*** | (2006.01) |

(52) U.S. Cl.

CPC ................. *H01Q 1/38* (2013.01); *H01Q 1/48* (2013.01); *H01Q 3/36* (2013.01)

(56) References Cited

U.S. PATENT DOCUMENTS

| | | | | |
|---|---|---|---|---|
| 2012/0212389 | A1 | 8/2012 | Aizawa et al. | |
| 2014/0285391 | A1 | 9/2014 | Baron et al. | |
| 2019/0296435 | A1* | 9/2019 | Wu | H01Q 3/24 |

FOREIGN PATENT DOCUMENTS

| | | | | | |
|---|---|---|---|---|---|
| CN | 102610902 | A | | 7/2012 | |
| CN | 103392263 | A | | 11/2013 | |
| CN | 205355251 | U | | 6/2016 | |
| CN | 106299705 | A | | 1/2017 | |
| CN | 106299724 | A | | 1/2017 | |
| CN | 106785359 | A | | 5/2017 | |
| CN | 108631057 | A | | 10/2018 | |
| CN | 109411876 | A | | 3/2019 | |
| CN | 109841941 | A | | 6/2019 | |
| CN | 110212299 | A | * | 9/2019 | H01Q 1/48 |
| KR | 101650340 | B1 | | 8/2016 | |

OTHER PUBLICATIONS

Haitao Liu et al., "Compact Dual-Band Antenna With Electronic Beam-Steering and Beamforming Capability", IEEE Antennas and Wireless Propagation Letters, vol. 10, 2011, Total 4 Pages.

* cited by examiner

DIRECTIONAL ANTENNA AND COMMUNICATION DEVICE

CROSS-REFERENCE TO RELATED APPLICATIONS

This application is a continuation of International Application No. PCT/CN2020/116346, filed on Sep. 19, 2020, which claims priority to Chinese Patent Application No. 201910927624.0, filed on Sep. 27, 2019. The disclosures of the aforementioned applications are hereby incorporated by reference in their entireties.

TECHNICAL FIELD

This application relates to the field of communication technologies, and in particular, to a directional antenna and a communication device.

BACKGROUND

A signal of an omni-directional antenna covers all directions uniformly and cannot be changed. Such omni-directional antenna cannot concentrate, based on the location of a user, radiation energy to the direction in which the user is located. Therefore, omni-directional antennas cannot implement directional radiation, and the gain in a specific direction that can be achieved by the antenna remains relatively small.

SUMMARY

This application provides a directional antenna and a communication device, to directionally radiate an electromagnetic wave, thereby increasing the gain of the antenna in a specific direction.

A directional antenna in this application includes an active element and a first reflector. The active element includes a first element and a second element. An operating frequency band of the first element is a first frequency band, and an operating frequency band of the second element is a second frequency band. An equivalent electrical length of the first reflector is equal to or slightly greater than one half of a wavelength of the first frequency band. The first reflector includes a first resonant circuit, and the first resonant circuit includes a first capacitive part and a first inductive part that are connected in parallel. A resonance frequency of the first resonant circuit is located within the second frequency band, and an equivalent electrical length of a part in the first reflector other than the first resonant circuit is less than one half of a wavelength of the second frequency band.

In the directional antenna in this application, because the equivalent electrical length of the first reflector is equal to or slightly greater than one half of the wavelength of the first frequency band, an electromagnetic wave whose frequency is within the first frequency band resonates on the first reflector. When an electromagnetic wave transmitted by the first element is transmitted to the first reflector, constructive interference occurs in a direction between an electromagnetic wave induced by the first reflector and the electromagnetic wave transmitted by the first element, so that a resultant total field is strengthened; and destructive interference occurs in another direction between the electromagnetic wave induced by the first reflector and the electromagnetic wave transmitted by the first element, so that a resultant total field is weakened. It is equivalent to that the first reflector reflects the electromagnetic wave transmitted by the first element, so as to enhance a gain of the directional antenna in a reflection direction and improve communication quality. It is noted that if the first reflector is too long, the electrical length of the first reflector is no longer "similar" to the radio wavelength and the first reflector would not have inductive reactance anymore. The up limit of the electrical length of the first reflector depends on several factors and can be determined based on the configuration of a specific antenna.

When an electromagnetic wave transmitted by the second element is transmitted to the first reflector, because the resonance frequency of the first resonant circuit is within the second frequency band, that is, because the resonance frequency of the first resonant circuit is close to the second frequency band, the electromagnetic wave transmitted by the second element resonates in the first resonant circuit and is in a high impedance state, and the first resonant circuit in a high impedance state approximates an insulator. The first resonant circuit in the high impedance state blocks an induced current generated on the first reflector by an electromagnetic wave whose frequency is located within the second frequency band. Therefore, only the part other than the first resonant circuit in the first reflector may generate an induced current. Because the equivalent electrical length of the part other than the first resonant circuit in the first reflector is less than one half of the wavelength of the second frequency band, the first reflector does not resonate within the second frequency band. Therefore, the first reflector is transparent to the electromagnetic wave transmitted by the second element, that is, the first reflector does not cause interference to the electromagnetic wave transmitted by the second element, such as relatively strong reflection and scattering. In other words, the first reflector hardly affects normal propagation of the electromagnetic wave transmitted by the second element.

In conclusion, when the directional antenna in this application operates, the first reflector can reflect the electromagnetic wave transmitted by the first element without distorting the electromagnetic wave transmitted by the second element. Because the first reflector may selectively reflect an electromagnetic wave of a specific frequency band in the two frequency bands, beam modes of the directional antenna within the first frequency band and the second frequency band are independent of each other, and the directional antenna may operate within the dual frequency bands based on independent directional modes.

In an implementation, an equivalent electrical length of the first element is equal to one half of the wavelength of the first frequency band, so as to transmit and receive the electromagnetic wave whose frequency is within the first frequency band; and an equivalent electrical length of the second element is equal to one half of the wavelength of the second frequency band, so as to transmit and receive the electromagnetic wave whose frequency is within the second frequency band.

In an implementation, the minimum frequency of the second frequency band is greater than the maximum frequency of the first frequency band.

In the directional antenna in this implementation, any frequency within the second frequency band is greater than a frequency of the first frequency band. In other words, the first frequency band is a low frequency band, and the second frequency band is a high frequency band. In this case, the first reflector is transparent to an electromagnetic wave whose frequency is relatively high, and reflects an electromagnetic wave whose frequency is relatively low. In other words, the first reflector is a low-frequency reflector that reflects an electromagnetic wave of a low frequency band and that is transparent to an electromagnetic wave of a high frequency band. In other words, the first reflector can reflect a low-frequency electromagnetic wave without affecting normal propagation of the electromagnetic wave of the high frequency band. The first reflector may selectively reflect an electromagnetic wave of a low frequency band among a plurality of frequency bands, so that the beam modes of the directional antenna within the low frequency band and the high frequency band are independent of each other, and the directional antenna can operate within the dual frequency bands based on independent directional modes.

In an implementation, the maximum frequency within the second frequency band is less than the minimum frequency of the first frequency band.

In the directional antenna in this implementation, any frequency within the second frequency band is less than a frequency of the first frequency band. In other words, the first frequency band is a high frequency band, and the second frequency band is a low frequency band. In this case, the first reflector is transparent to an electromagnetic wave whose frequency is relatively low, and reflects an electromagnetic wave whose frequency is relatively high. Therefore, the first reflector is a high-frequency reflector that reflects an electromagnetic wave of a high frequency band and that is transparent to an electromagnetic wave of a low frequency band.

In an implementation, the active element further includes a third element, an operating frequency band of the third element is a third frequency band, and the first reflector further includes a second resonant circuit connected in series to the first resonant circuit.

The second resonant circuit includes a second capacitive part and a second inductive part that are connected in parallel, and a resonance frequency of the second resonant circuit is located within the third frequency band.

When an electromagnetic wave transmitted by the third element is transmitted to the first reflector, because the resonance frequency of the second resonant circuit is located within the third frequency band, that is, because the resonance frequency of the second resonant circuit is close to the third frequency band, the electromagnetic wave transmitted by the third element resonates in the second resonant circuit and is in a high impedance state. In this case, the second resonant circuit is equivalent to an insulator. The second resonant circuit in a high impedance state blocks an induced current generated on the first reflector by an electromagnetic wave whose frequency is located within the third frequency band, so that the first reflector does not resonate within the third frequency band. Therefore, the first reflector is transparent to the electromagnetic wave transmitted by the third element, that is, the first reflector does not cause interference such as relatively strong reflection and scattering to the electromagnetic wave transmitted by the third element. In other words, the first reflector hardly affects normal propagation of the electromagnetic wave transmitted by the third element.

In other words, when the directional antenna in this implementation operates, the first reflector can reflect the electromagnetic wave transmitted by the first element without distorting the electromagnetic wave transmitted by the second element and the electromagnetic wave transmitted by the third element. Because the first reflector may selectively reflect an electromagnetic wave of a specific frequency band among the three frequency bands, the beam modes of the directional antenna within the first frequency band, the second frequency band, and the third frequency band are independent of each other, and the directional antenna may operate within the three frequency bands based on independent directional modes.

In an implementation, an equivalent electrical length of the third element is equal to one half of a wavelength of the third frequency band, so as to transmit and receive the electromagnetic wave whose frequency is located within the third frequency band.

In an implementation, the first reflector further includes a conductive part, the conductive part is connected in series to the first resonant circuit, and the equivalent electrical length of the first reflector minus an equivalent electrical length of the conductive part is less than one half of the wavelength of the first frequency band.

When an equivalent electrical length of the first resonant circuit is less than one half of the wavelength of the first frequency band, adding the conductive part may increase a mechanical length of the first reflector, so as to supplement the equivalent electrical length of the first reflector. In this way, the equivalent electrical length of the first reflector is equal to or slightly greater than one half of the wavelength of the first frequency band, so that the first reflector can reflect the electromagnetic wave transmitted by the first element.

In an implementation, the directional antenna further includes a second reflector, and an equivalent electrical length of the second reflector is equal to or slightly greater than one half of the wavelength of the second frequency band, so that the electromagnetic wave whose frequency is located within the second frequency band resonates on the second reflector. When the electromagnetic wave transmitted by the second element is transmitted to the second reflector, constructive interference occurs in a direction between an electromagnetic wave induced by the second reflector and the electromagnetic wave transmitted by the second element, so that a resultant total field is strengthened; and destructive interference occurs in another direction between the electromagnetic wave induced by the second reflector and the electromagnetic wave transmitted by the second element, so that a resultant total field is weakened. It is equivalent to that the second reflector reflects the electromagnetic wave transmitted by the second element, so as to enhance the gain of the directional antenna in the reflection direction and improve the communication quality.

In an implementation, the directional antenna further includes a mounting plate, the mounting plate includes a first mounting surface, a first functional layer is disposed on the first mounting surface, the active element is located within the first functional layer, and the active element may be formed on the first mounting surface by using a printing process, to simplify a production process of the active element.

In an implementation, both the first capacitive part and the first inductive part are located within the first functional layer and may be formed in a same process with the active element, and no additional process is needed to form the first capacitive part and the first inductive part, thereby reducing preparation costs of the directional antenna. In addition, both the first capacitive part and the first inductive part are located within the first functional layer, that is, both the first capacitive part and the first inductive part are formed by existing physical structures of the entities, and do not need to be assembled on the mounting surface by using a welding process, thereby avoiding a parasitic effect caused by a process such as welding.

In an implementation, a material of the first functional layer is a conductor such as metal.

In an implementation, the mounting plate further includes a second mounting surface opposite to the first mounting surface, a second functional layer is disposed on the second mounting surface, both the first capacitive part and the second inductive part are located within the second functional layer or the first capacitive part and the second inductive part are respectively located within the first functional layer and the second functional layer, and the first capacitive part and the first inductive part are disposed directly opposite to each other. Therefore, a horizontal size of the first resonant circuit is reduced, and then a horizontal size of the first reflector is reduced, thereby improving compactness of a structure of the directional antenna and facilitating miniaturized design of the directional antenna.

In some implementations, a material of the second functional layer is a conductor such as metal.

In an implementation, the first capacitive part includes a plurality of metal blocks disposed at intervals and slots among the plurality of metal blocks, where the shape of the slot includes but is not limited to shapes such as a straight line, a broken line, or a curve.

In an implementation, the first inductive part includes a metal wire of a waveform, where the shape of the waveform includes but is not limited to shapes such as a rectangular wave, a sawtooth wave, or a sinusoidal wave.

In an implementation, the directional antenna further includes a floor, the floor includes a bearing surface, the bearing surface bears the mounting plate, an included angle between the bearing surface and the first mounting surface is equal to 90 degrees, a conductive layer is disposed on the bearing surface, and the conductive layer is electrically connected to the active element and the first reflector.

In the directional antenna in this implementation, the conductive layer mirrors the active element and the first reflector based on a mirror image theory of an electromagnetic wave. In this case, the equivalent electrical length of the first element is equal to a sum of an electrical length of the first element and an electrical length of a mirror image that is of the first element and that is at the conductive layer, the equivalent electrical length of the second element is equal to a sum of an electrical length of the second element and an electrical length of a mirror image that is of the second element and that is at the conductive layer, and the equivalent electrical length of the first reflector is equal to a sum of an electrical length of the first reflector and an electrical length of a mirror image that is of the first reflector and that is at the conductive layer. That is, in the directional antenna shown in this implementation, the conductive layer is used to mirror the active element and the first reflector, so that the size of the active element and the size of the first reflector are reduced, thereby reducing the size of the directional antenna. This not only reduces the preparation costs of the directional antenna, but also improves the compactness of the structure of the directional antenna, thereby facilitating the miniaturized design of the directional antenna.

In an implementation, the conductive layer is further electrically connected to the second reflector, to mirror the second reflector, so as to reduce a size of the second reflector, thereby reducing the size of the directional antenna. This reduces the preparation costs of the directional antenna, further improves the compactness of the structure of the directional antenna, and facilitates the miniaturized design of the directional antenna.

In an implementation, a material of the conductive layer is a conductor such as metal.

In an implementation, a material of the floor is metal, and the floor and the conductive layer are integrally formed as a metal plate body, to simplify a preparation process of the directional antenna and reduce production costs of the directional antenna.

In an implementation, the first reflector further includes a control switch, and the control switch is connected in series to the first resonant circuit, and is electrically connected between the first resonant circuit and the conductive layer.

When the control switch is closed, the sum of the electrical length of the first reflector and the electrical length of the mirror image of the first reflector at the conductive layer is equal to or slightly greater than one half of the wavelength of the first frequency band.

In the directional antenna in this implementation, an electrical connection state between the first resonant circuit and the conductive layer is controlled by the control switch, that is, a conduction state between the first reflector and the conductive layer is controlled, so that when the directional antenna operates, conduction and disconnection between the first reflector and the conductive layer may be selected based on a specific requirement, to control whether the first reflector reflects the electromagnetic wave transmitted by the first element.

In an implementation, the control switch includes but is not limited to a switch such as a PIN-type diode, a micro electro mechanical system switch, or a photoelectric switch.

In an implementation, the frequency of the second frequency band is approximately twice the frequency of the first frequency band, that is, a wavelength of the electromagnetic wave whose frequency is located within the first frequency band is approximately twice a wavelength of the electromagnetic wave whose frequency is located within the first frequency band.

In the directional antenna shown in this implementation, the electrical length of the first reflector is equal to or slightly greater than one quarter of the wavelength of the first frequency band, that is, a mechanical length of the first reflector is equal to or slightly greater than one quarter of the wavelength of the first frequency band, and the mechanical length of the first reflector is equal to or slightly greater than one half of the wavelength of the second frequency band. If the electromagnetic wave transmitted by the second element is transmitted to the first reflector, the first resonant circuit approximates an insulator, and an induced current may be generated only by the part other than the first resonant circuit in the first reflector. Although the mechanical length of the first reflector is equal to or slightly greater than one half of the wavelength of the second frequency band, the equivalent electrical length of the part other than the first resonant circuit in the first reflector is less than one half of the wavelength of the second frequency band, and the first reflector does not resonate within the second frequency band, and is transparent to the electromagnetic wave emitted by the second element.

In an implementation, the included angle between the bearing surface and the first mounting surface is less than 90 degrees.

A communication device in this application includes a radio frequency module and the directional antenna described in any implementation described above, where the radio frequency module is electrically connected to the active element of the directional antenna, to send an electromagnetic signal to the active element of the directional antenna, and receive an electromagnetic signal received by the active element.

The communication device in this application includes the foregoing directional antenna. When the directional antenna operates, the first reflector can reflect the electromagnetic wave transmitted by the first element without affecting normal propagation of the electromagnetic wave transmitted by the second element. The first reflector may selectively reflect the electromagnetic wave of the specific frequency band between the two frequency bands, so that the beam modes of the directional antenna within the first frequency band and the second frequency band are independent of each other, and the directional antenna can operate in the dual frequency bands based on the independent directional modes.

BRIEF DESCRIPTION OF DRAWINGS

To describe technical solutions in embodiments of this application more clearly, the following describes the accompanying drawings required for the embodiments in this application.

DESCRIPTION OF EMBODIMENTS

The following describes, with reference to the accompanying drawings, the solutions provided in embodiments of this application.

The following describes implementations of this application with reference to the accompanying drawings in the implementations of this application.

Figure 1:
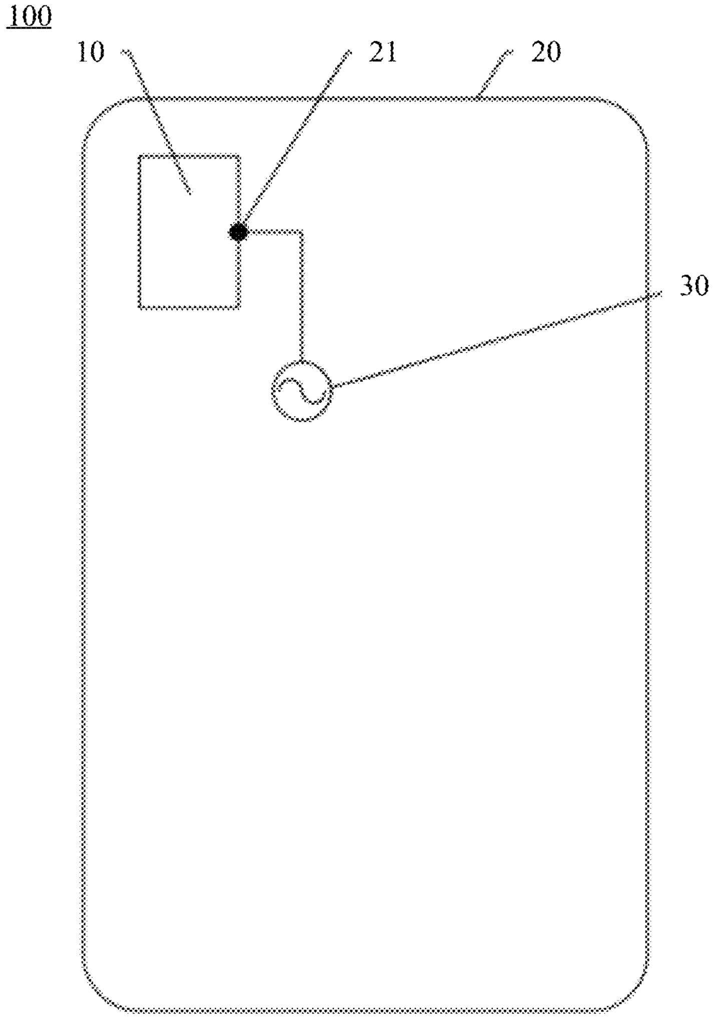
FIG. 1 is a schematic diagram of a structure of a communication device according to an embodiment of this application.

First, FIG. 1 is a schematic diagram of a structure of a communication device 100 according to an embodiment of this application.

The communication device 100 provided in this embodiment of this application includes but is not limited to an electronic product that has a wireless communication function, such as a cellular base station, a wireless local area network (WLAN) device, a mobile phone, a tablet computer, a computer, or a wearable device. The communication device 100 includes a directional antenna 10, a device body 20, and a radio frequency module 30. Both the directional antenna 10 and the radio frequency module 30 are assembled on the device body 20. The radio frequency module 30 is electrically connected to the directional antenna 10, to receive/send an electromagnetic signal from/to an active element (not shown in the figure) of the directional antenna 10 by using a feed point 21. The directional antenna 10 radiates an electromagnetic wave based on a received electromagnetic signal or sends an electromagnetic signal to the radio frequency module 30 based on a received electromagnetic wave, to implement transceiving of a radio signal. The radio frequency module (RF module) 30 is a circuit that may transmit and/or receive a radio frequency signal, such as a transceiver (transmitter and/or receiver, T/R).

Figure 2:
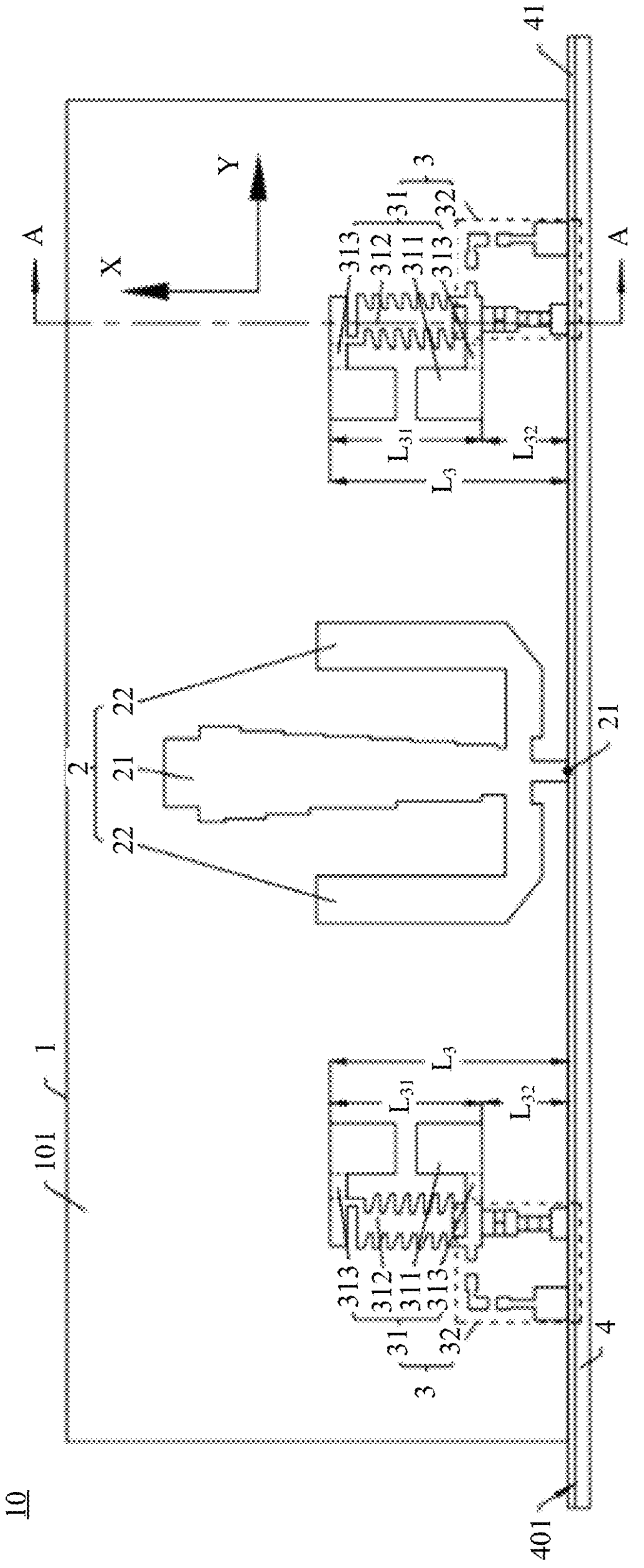
FIG. 2 is a schematic diagram of a structure of a directional antenna according to an embodiment of this application.
Figure 3:
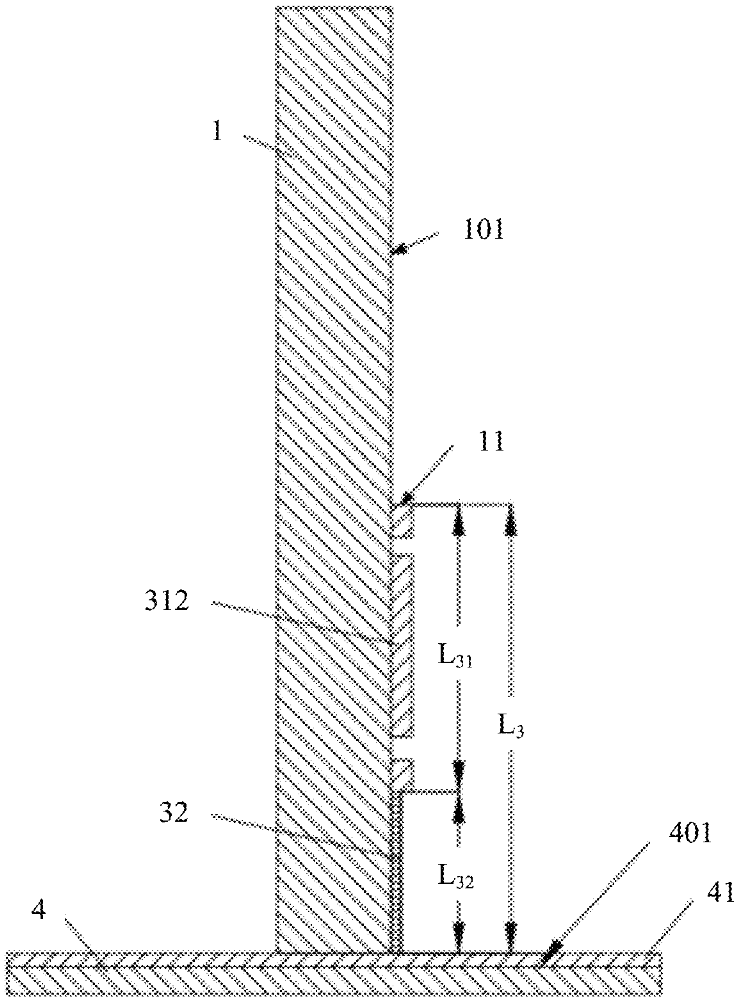
FIG. 3 is a schematic diagram of a cross-sectional structure of the directional antenna shown in FIG. 2 in a direction A-A.

Refer to FIG. 2 and FIG. 3. FIG. 2 is a schematic diagram of a structure of a directional antenna 10 according to an embodiment of this application. The directional antenna 10 corresponds to the directional antenna 10 in the communication device 100 shown in FIG. 1. FIG. 3 is a schematic diagram of a cross-sectional structure of the directional antenna 10 shown in FIG. 2 in a direction A-A. The schematic diagram of the cross-sectional structure in the direction A-A is a schematic cross-sectional diagram obtained by cutting the directional antenna 10 along a dash-dot line position shown in the figure.

The directional antenna 10 includes a mounting plate 1, an active element 2, a first reflector 3, and a floor 4. The mounting plate 1 includes a first mounting surface 101, and the active element 2 and the first reflector 3 are disposed on the first mounting surface 101. The active element 2 includes a first element 21 and a second element 22, an operating frequency band of the first element 21 is a first frequency band, and an operating frequency band of the second element 22 is a second frequency band. An equivalent electrical length of the first reflector 3 is equal to or slightly greater than one half of a wavelength of the first frequency band. The first reflector 3 includes a first resonant circuit 31, the first resonant circuit 31 includes a first capacitive part 311 and a first inductive part 312 that are connected in parallel, and a resonance frequency of the first resonant circuit 31 is within the second frequency band. An equivalent electrical length of a part other than the first resonant circuit 31 in the first reflector 3 is less than one half of a wavelength of the second frequency band. The floor 4 includes a bearing surface 401, the bearing surface 401 bears the mounting plate 1, an included angle between the bearing surface 401 and the first mounting surface 101 is equal to 90 degrees, a conductive layer 41 is disposed on the bearing surface 401, and the conductive layer 41 is electrically connected to the active element 2 and the first reflector 3. In this embodiment, when a component is electrically connected to the conductive layer 41, an equivalent electrical length of the component is equal to a sum of an actual electrical length of the component and an electrical length of a mirror image that is of the component and that is at the conductive layer 41, that is, the equivalent electrical length of the component is twice the actual electrical length of the component. When the component is not electrically connected to the conductive layer 41, the equivalent electrical length of the component is equal to the actual electrical length of the component. The electrical length refers to a ratio of a mechanical length (also referred to as a physical length or a geometric length) of a propagation medium or structure to a wavelength of an electromagnetic wave propagated on the medium or structure.

In the directional antenna 10 shown in this embodiment, because the equivalent electrical length of the first reflector 3 is equal to or slightly greater than one half of the wavelength of the first frequency band, an electromagnetic wave whose frequency is within the first frequency band resonates on the first reflector 3. When an electromagnetic wave transmitted by the first element 21 is transmitted to the first reflector 3, constructive interference occurs in a direction between an electromagnetic wave induced by the first reflector 3 and an electromagnetic wave transmitted by the first element 31, so that a resultant total field is strengthened; and destructive interference occurs in another direction between the electromagnetic wave induced by the first reflector 3 and the electromagnetic wave transmitted by the first element 31, so that a resultant total field is weakened. It is equivalent to that the first reflector 3 reflects the electromagnetic wave transmitted by the first element 21, so as to enhance a gain of the directional antenna 10 in a reflection direction and improve communication quality.

When an electromagnetic wave transmitted by the second element 22 is transmitted to the first reflector 3, because the resonance frequency of the first resonant circuit 31 is located within the second frequency band, that is, because the resonance frequency of the first resonant circuit 31 is close to the second frequency band, the first resonant circuit 31 resonates and is in a high impedance state, and the first resonant circuit 31 in the high impedance state approximates an insulator. The first resonant circuit 31 in the high impedance state blocks an induced current generated on the first reflector 3 by a current whose frequency is located within the second frequency band. Therefore, only the part other than the first resonant circuit 31 in the first reflector 3 can generate an induced current. Because the equivalent electrical length of the part other than the first resonant circuit 31 in the first reflector 3 is less than one half of the wavelength of the second frequency band, the first reflector 3 does not resonate within the second frequency band. Therefore, the first reflector 3 is transparent to the electromagnetic wave transmitted by the second element 22. In other words, the first reflector 3 hardly affects normal propagation of the electromagnetic wave transmitted by the second element 22.

That is, when the directional antenna 10 shown in this embodiment operates, the first reflector 3 can reflect the electromagnetic wave transmitted by the first element 21, does not cause interference, such as relatively strong reflection and scattering, to the electromagnetic wave transmitted by the second element 22, and does not distort the electromagnetic wave transmitted by the second element 22. Because the first reflector 3 may selectively reflect an electromagnetic wave of a specific frequency band in the two frequency bands, the beam modes of the directional antenna 10 within the first frequency band and the second frequency band are independent of each other, and the directional antenna 10 may operate within the dual frequency bands based on independent directional modes.

In this embodiment, the mounting plate 1 is a printed circuit board (PCB), and a first functional layer 11 is disposed on the first mounting surface 101 of the mounting plate 1. In some embodiments, a material of the first functional layer 11 is metallic copper. In other words, the first functional layer 11 is a copper layer disposed on the first mounting surface 101. In an implementation, the first functional layer 11 is printed on the first mounting surface 101. In another embodiment, the mounting plate may be alternatively another substrate that has a bearing function, and the material of the first functional layer may be alternatively another conductor. This is not specifically limited in this application.

The active element 2 is located in a middle area of the first mounting surface 101. The active element 2 is located within the first functional layer 11, and may be printed on the first mounting surface 101, to simplify a preparation process of the active element 2. Specifically, the active element 2 extends in an X-axis direction of the first mounting surface 101, and a feed point 21 is disposed at a bottom of the active element 2. The feed point 21 is connected to a radio frequency module 30 by using a feeder (not shown in the figure). The active element 2 receives, by using the feed point 21, an electromagnetic signal sent by the radio frequency module 30 or sends a received external electromagnetic signal to the radio frequency module 30. In an implementation, the feeder is a transmission line including two conductors, two conductors at one end of the transmission line are electrically connected to the feed point 21 and the conductive layer 41 respectively, and the other end of the transmission line is electrically connected to a port of the radio frequency module 30. In this embodiment, the X-axis direction of the first mounting surface 101 is a direction that is on the first mounting surface 101 and that is perpendicular to the bearing surface 401.

The active element 2 includes one first element 21 and two second elements 22. Specifically, the first element 21 extends in the X-axis direction, and an equivalent electrical length of the first element 21 is equal to one half of a wavelength $\lambda_1$ of the first frequency band, to transmit or receive the electromagnetic wave whose frequency is located within the first frequency band. In this embodiment, a sum of an electrical length of the first element 21 and an electrical length of a mirror image that is of the first element 21 and that is at the conductive layer 41 is equal to the equivalent electrical length of the first element 21. Because the included angle between the first mounting surface 101 and the bearing surface 401 is 90 degrees, the electrical length of the first element 21 is equal to the electrical length of the mirror image of the first element 21 at the conductive layer 41, that is, twice the electrical length of the first element 21 is equal to the equivalent electrical length of the first element 21. In this case, the electrical length of the first element 21 is equal to one quarter of the wavelength of the first frequency band.

The two second elements 22 are symmetrically distributed on two sides of the first element 21, and there is a gap between each second element 22 and the first element 21. An equivalent electrical length of the second element 22 is equal to one half of a wavelength $\lambda_2$ of the second frequency band, so as to transmit or receive the electromagnetic wave whose frequency is located within the second frequency band. In this embodiment, a sum of an electrical length of the second element 22 and an electrical length of a mirror image that is of the second element 22 and that is at the conductive layer 41 is equal to the equivalent electrical length of the second element 22. Because the included angle between the first mounting surface 101 and the bearing surface 401 is 90 degrees, the electrical length of the second element 22 is equal to the electrical length of the mirror image the second element 22 at the conductive layer 41, that is, twice the electrical length of the second element 22 is equal to the equivalent electrical length of the second element 22. In this case, the electrical length of the second element 22 is equal to one quarter of the wavelength of the second frequency band.

In this embodiment, the minimum frequency within the second frequency band is greater than the maximum frequency of the first frequency band, namely, $\lambda_2<\lambda_1$. That is, the operating frequency band of the first element 21 is a low frequency band, the operating frequency band of the second element 22 is a high frequency band, and the first reflector 3 is a low-frequency reflector that reflects an electromagnetic wave of a low frequency band and that is transparent to an electromagnetic wave of a high frequency band. In an implementation, a frequency of the second frequency band is approximately twice a frequency of the first frequency band, namely, $2\lambda_2\approx\lambda_1$. In another implementation, the frequency of the second frequency band may be approximately another multiple of the frequency of the first frequency band. This is not specifically limited in this embodiment.

Because an equivalent electrical length of the low-frequency reflector within the low frequency band is equal to or slightly greater than one half of a wavelength of the low frequency band, an equivalent electrical length of the low-frequency reflector within the high frequency band is greater than one half of a wavelength of the high frequency band. When the electromagnetic wave of the high frequency band is transmitted to the low-frequency reflector, the low-frequency reflector causes interference such as relatively strong reflection and scattering to the electromagnetic wave of the high frequency band, resulting in distortion of the electromagnetic wave of the high frequency band. However, in the directional antenna 10 shown in this implementation, the first reflector 3 not only does not reflect the electromagnetic wave of the low frequency band, but also is transparent to the electromagnetic wave of the high frequency band, and does not cause interference to the electromagnetic wave of the high frequency band, so that when being transmitted to the first reflector 3, the electromagnetic wave of the high frequency band is not distorted and normal propagation is maintained. The first reflector 3 may selectively reflect the electromagnetic wave of the low frequency band in the dual frequency bands, so that the beam modes of the directional antenna 10 within the low frequency band and the high frequency band are independent of each other, and the directional antenna 10 can operate within the dual frequency bands based on independent directional modes. In another embodiment, the maximum frequency of the second frequency band may be alternatively less than the minimum frequency of the first frequency band. In other words, the operating frequency band of the first element is a high frequency band, and the operating frequency band of the second element is a low frequency band. This is not specifically limited in this embodiment.

Figure 4:
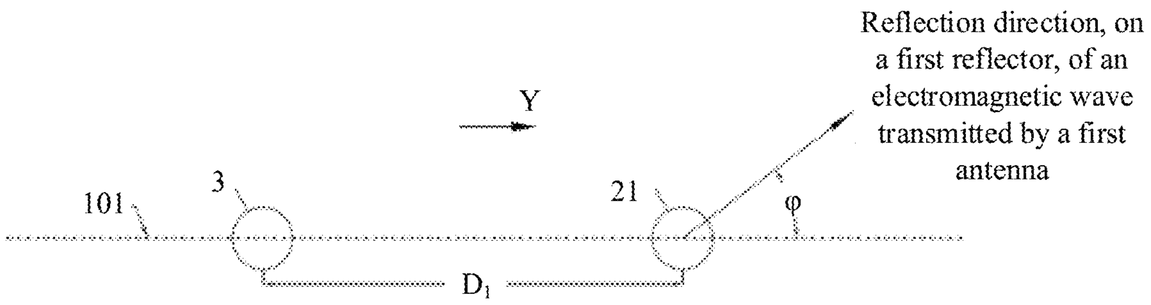
FIG. 4 is a simple schematic diagram of a structure of a first reflector and a first element in the directional antenna shown in FIG. 2.

FIG. 4 is a simple schematic diagram of a structure of the first reflector 3 and the first element 21 in the directional antenna 10 shown in FIG. 2.

The first reflector 3 is located around the first element 21 in the active element 2, and there is a gap between the first reflector 3 and the first element 21. Specifically, in a Y-axis direction of the first mounting surface 101, a distance between the first reflector 3 and the first element 21 is $D_1$, an included angle between the first mounting surface 101 and a reflection direction, on the first reflector 3, of the electromagnetic wave transmitted by the first element 21 is $\varphi$, and a wavelength of the electromagnetic wave transmitted by the first element 21 is $\lambda_1$. In this embodiment of this application, the Y-axis direction of the first mounting surface 101 refers to a direction that is on the first mounting surface 101 and that is perpendicular to the X-axis, a Y-axis positive direction is a right direction, and a Y-axis negative direction is a left direction.

Based on an interference principle of an electromagnetic wave, the foregoing three parameters meet a formula $$D_1 = \frac{(2n-1)\lambda_1}{2(\cos\varphi + 1)}.$$

n is a natural number that is not equal to 0. It can be learned from the formula that, if the distance $D_1$ between the first reflector 3 and the first element 21 approximates $\lambda_1/4$, $\varphi\approx 0$. In this case, the first reflector 3 reflects, to the right side, the electromagnetic wave transmitted by the first element 21. If the distance $D_1$ between the first reflector 3 and the first element 21 approximates $\lambda_1/2$, $\varphi\approx\pm\pi/2$. In this case, the first reflector 3 reflects, to a direction perpendicular to the first mounting surface 101, the electromagnetic wave transmitted by the first element 21. In other words, the reflection direction, on the first reflector 3, of the electromagnetic wave transmitted by the first element 21 may be changed by adjusting a size of the distance $D_1$ between the first reflector 3 and the first element 21. When the directional antenna 10 is designed, the distance $D_1$ between the first reflector 3 and the first element 21 may be determined based on an actual requirement, so as to increase a gain of the directional antenna 10 in a specific direction.

In this embodiment, the distance $D_1$ between the first reflector 3 and the first element 21 approximates $\lambda_1/4$ in the Y-axis direction. Specifically, the first reflector 3 is located in an edge area of the first mounting surface 101, and extends in the X-axis direction. The first resonant circuit 31 of the first reflector 3 is located within the first functional layer 11, that is, the first resonant circuit 31 may be formed in a same process with the active element 2, and no additional process is needed to form the first resonant circuit 31, thereby reducing production costs of the directional antenna 10. In addition, the first resonant circuit 31 is a physical structure located on the first mounting surface 101, and does not need to be assembled on the first mounting surface 101 by using an additional welding process, thereby effectively avoiding a parasitic effect caused by a process such as welding. In another embodiment, the first resonant circuit may alternatively include electronic components that are connected to each other. For example, the first capacitive part may be an electronic component that functions as a capacitor or the like, and the first inductive part may be an electronic component that can function as an inductor or the like, provided that the equivalent electrical length of the first reflector is equal to or slightly greater than one half of the wavelength of the first frequency band, and the electromagnetic wave transmitted by the first element can be reflected.

Figure 5:
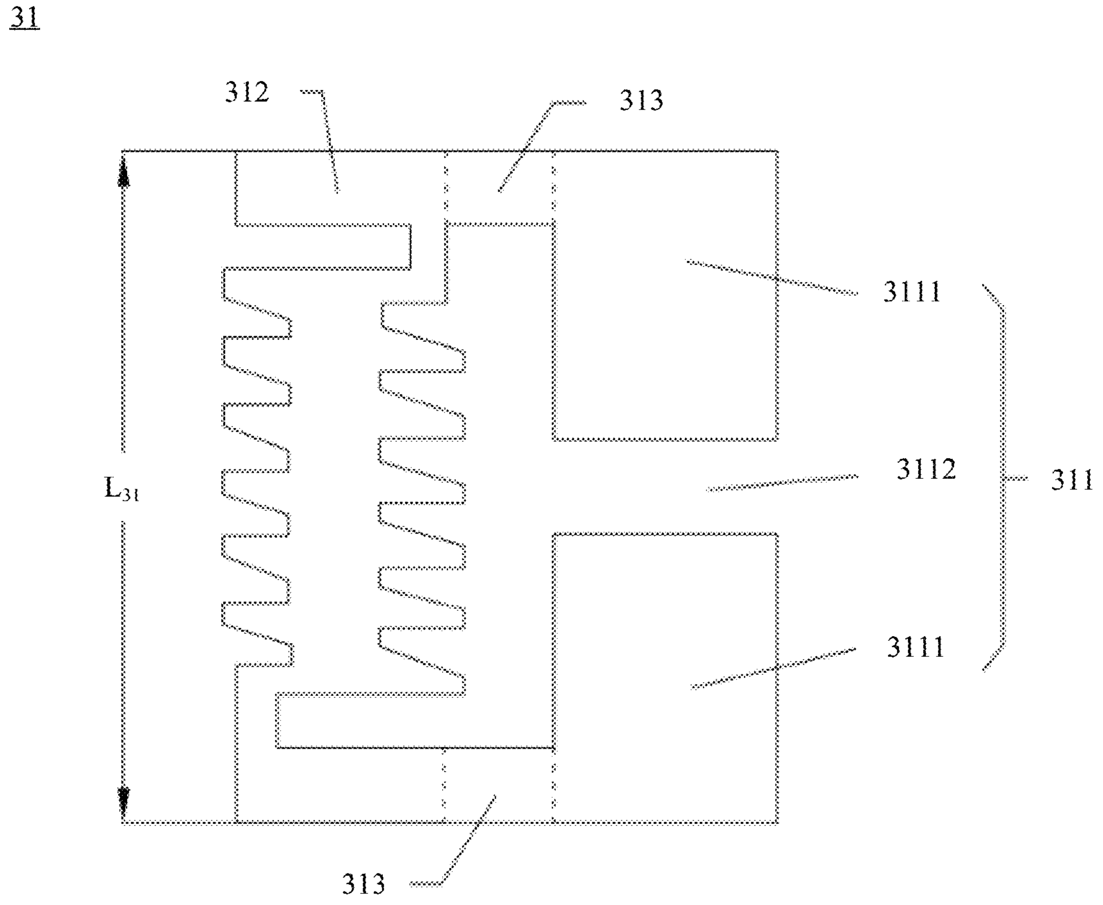
FIG. 5 is a detailed schematic diagram of a structure of a first resonant circuit in the first reflector shown in FIG. 2.
Figure 6A:
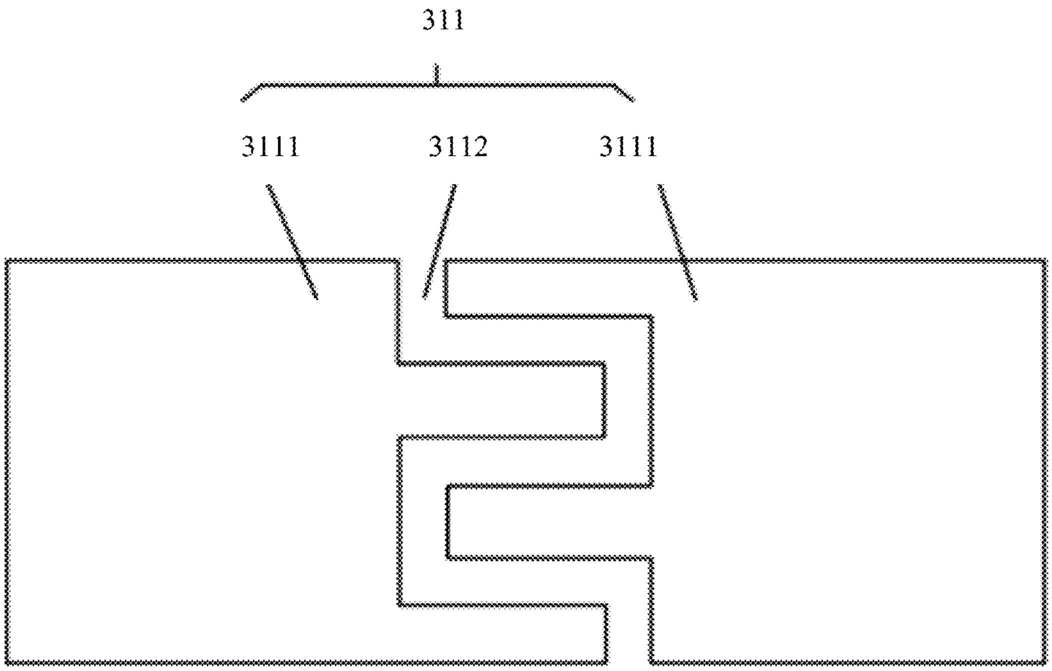
FIG. 6A to FIG. 6E are schematic diagrams of structures of other implementations of a first capacitive part in the first resonant circuit shown in FIG. 5.
Figure 6B:
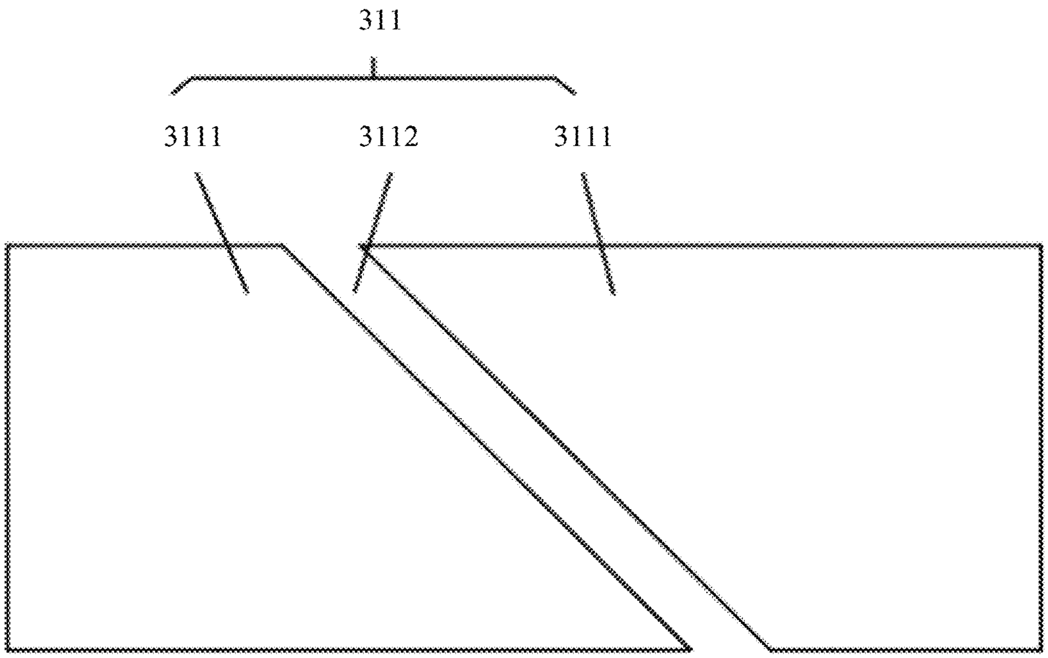
Figure 6C:
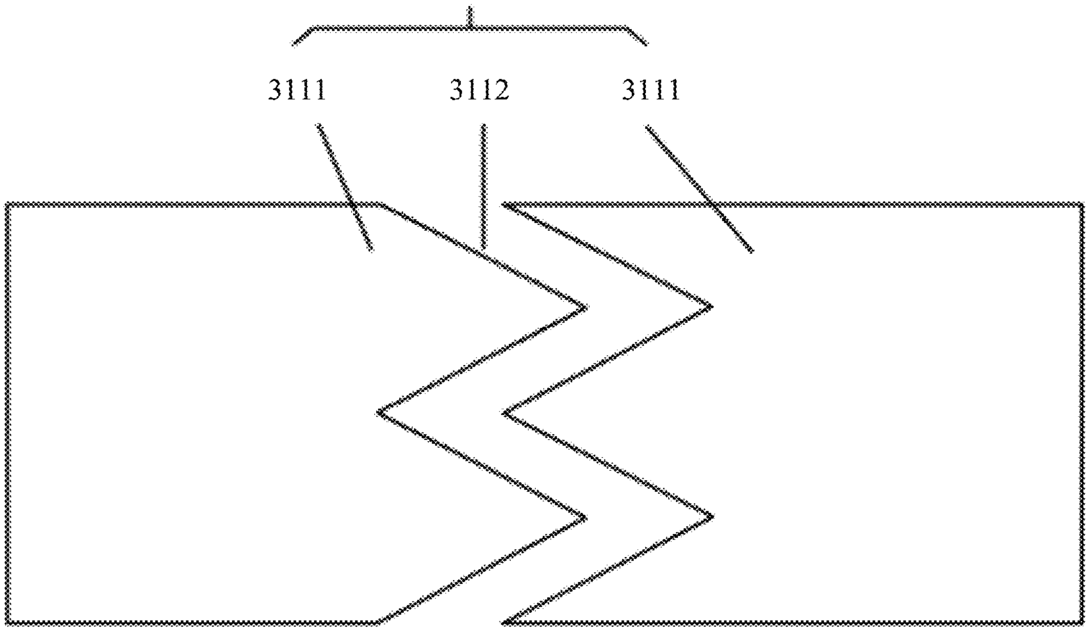
Figure 6D:
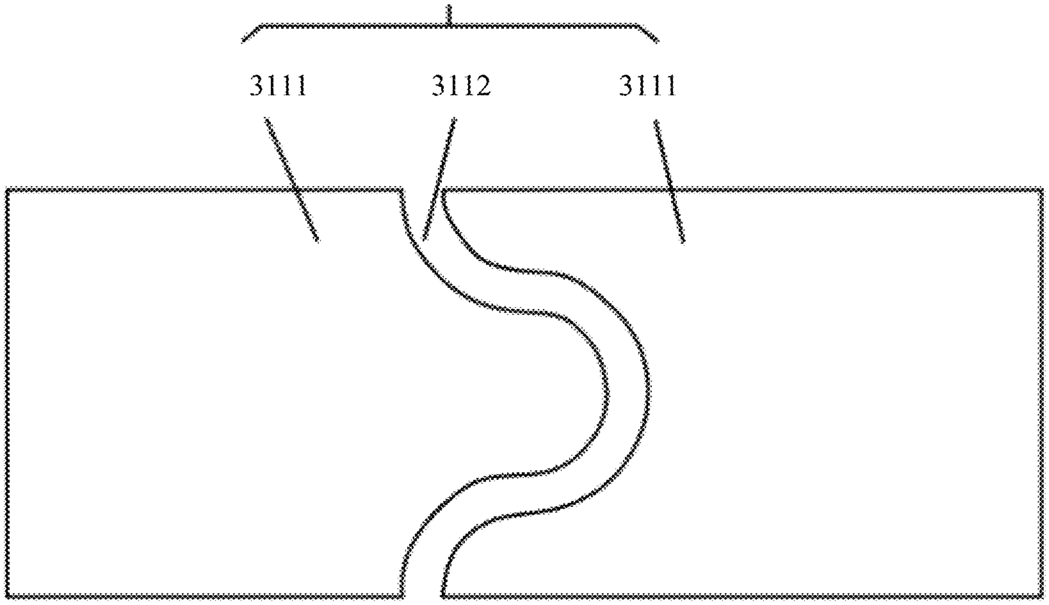
Figure 6E:
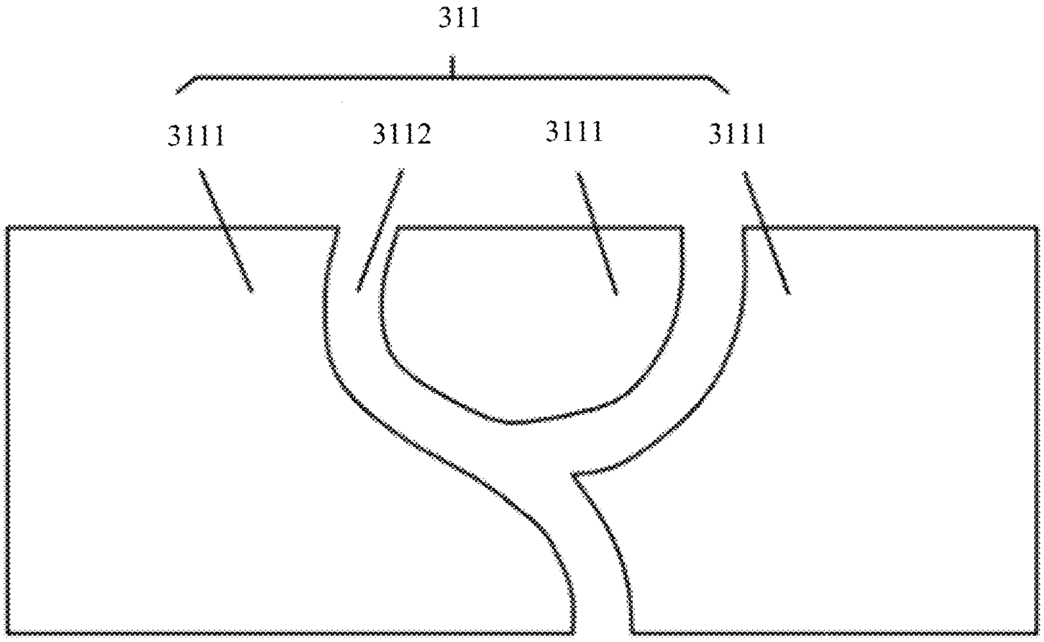
Figure 7A:
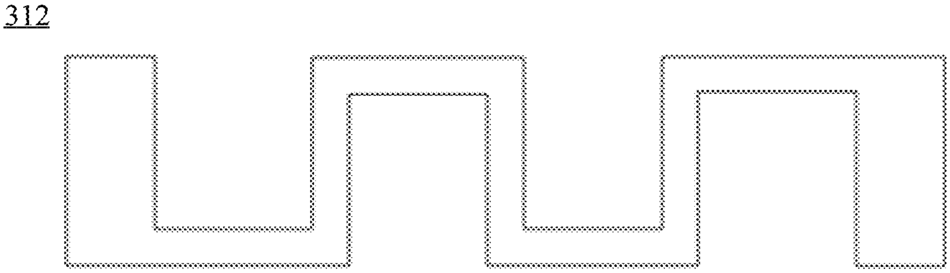
FIG. 7A to FIG. 7D are schematic diagrams of structures of other implementations of a first inductive part in the first resonant circuit shown in FIG. 5.
Figure 7B:
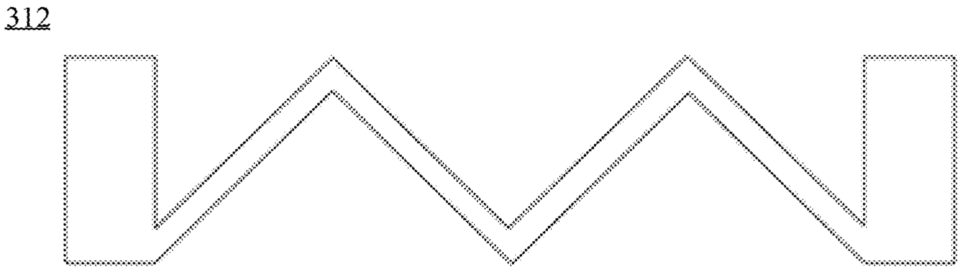
Figure 7C:
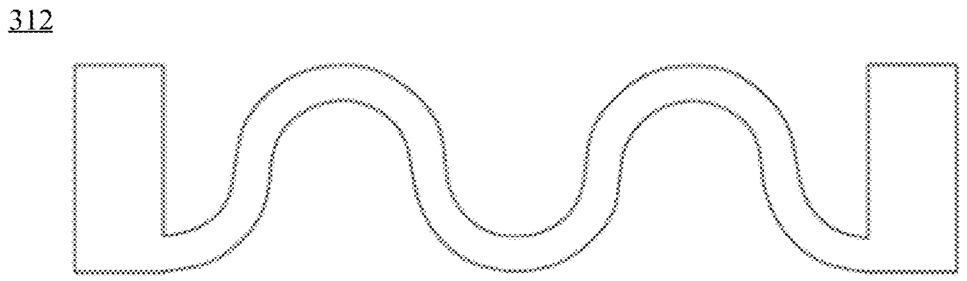
Figure 7D:
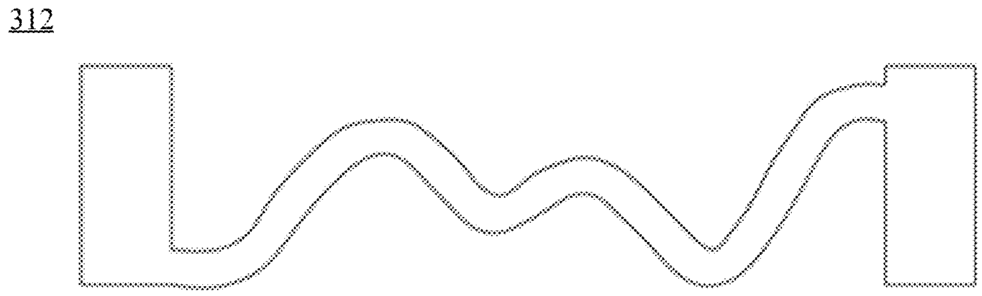

FIG. 5 is a detailed schematic diagram of a structure of the first resonant circuit 31 in the first reflector 3 shown in FIG. 2.

Both the first capacitive part 311 and the first inductive part 312 in the first resonant circuit 31 are physical structures located on the first mounting surface 101. In this embodiment, the first capacitive part 311 includes two metal blocks 3111 disposed at an interval and a slot 3112 located between the two metal blocks 3111. Specifically, the length directions of the two metal blocks 3111 are parallel to the X-axis direction, and the slot 3112 is a linear slot extending in the Y-axis direction, so as to reduce a size of the first capacitive part 311 in the Y-axis direction, reduce a size of the first resonant circuit 31 in the Y-axis direction, and further reduce a size of the first reflector 3 in the Y-axis direction. As shown in FIG. 6A to FIG. 6E, the first capacitive part 311 may include at least three metal blocks 3111 and the slots 3112 among the metal blocks 3111, and the shape of the slot 3112 includes but is not limited to shapes such as a straight line, a broken line, or a curve.

The first inductive part 312 is located on the left side of the first capacitive part 311, and there is a gap between the first inductive part 312 and the first capacitive part 311. The first inductive part 312 includes a metal wire shaped in a waveform. In this embodiment, a length direction of the first inductive part 312 is parallel to the X-axis direction, so as to reduce the size of the first inductive part 312 in the Y-axis direction, reduce the size of the first resonant circuit 31 in the Y-axis direction, and further reduce the size of the first reflector 3 in the Y-axis direction. Specifically, the first inductive part 312 and the first capacitive part 311 are disposed directly opposite to each other, and a size of the first inductive part 312 and a size of the first capacitive part 311 are the same in the X-axis direction, that is, a size L31 of the first resonant circuit 31 in the X-axis direction is equal to the size of the first inductive part 312 or the size of the first capacitive part 311 in the X-axis direction. The waveform of the metal wire included in the first inductive part 312 includes but is not limited to any waveform such as a rectangular wave or a sinusoidal wave, as shown in FIG. 7A to FIG. 7D. In another embodiment, the first inductive part and the first capacitive part may be alternatively disposed not opposite to each other. A location relationship between the first inductive part and the first capacitive part is not specifically limited in this application, provided that the first inductive part is connected in parallel to the first capacitive part.

The first resonant circuit 31 further includes first connectors 313 connected between the first inductive part 312 and the first capacitive part 311. In this embodiment, there are two first connectors 313. The two first connectors 313 are respectively connected to two ends of the first capacitive part 311 and two ends of the first inductive part 312, and are integrally formed with the first capacitive part 311 and the first inductive part 312, so that the first capacitive part 311 and the first inductive part 312 are connected in parallel by using the first connectors 313. Specifically, one first connector 313 is connected to one metal block 3111 of the first capacitive part 311 and one end of the first inductive part 312, and the other first connector 313 is connected to the other metal block 3111 of the first capacitive part 311 and the other end of the first inductive part 312. In another embodiment, there may be more than two first connectors. The more than two first connectors are respectively connected to the two ends of the first capacitive part and the two ends of the first inductive part, so that the first capacitive part and the first inductive part are connected in parallel. The quantity of the first connectors is not specifically limited in this application.

Based on a resonant circuit principle, if a capacitance value of the first capacitive part 311 is C and an inductance value of the first inductive part 312 is L, a resonance frequency formula of the first resonant circuit 31 is $$f_{LC} = \frac{1}{2\pi\sqrt{LC}}.$$

Because the resonance frequency of the first resonant circuit 31 is located within the second frequency band, the resonance frequency of the first resonant circuit 31 is far away from the first frequency band. When the electromagnetic wave whose frequency is located within the first frequency band is transmitted to the first reflector 3, because the resonance frequency of the first resonant circuit 31 is far away from the first frequency band, the first resonant circuit 31 does not resonate and is in a low impedance state, and a current generated on the first reflector 3 by the electromagnetic wave whose frequency is located within the first frequency band may flow through the first resonant circuit 31 in the low impedance state. In this case, the first resonant circuit 31 approximates a conductor. When the electromagnetic wave whose frequency is located within the second frequency band is transmitted to the first reflector 3, because the resonance frequency of the first resonant circuit 31 is located within the second frequency band, the first resonant circuit 31 resonates and is in a high impedance state, and a current generated on the first reflector 3 by the electromagnetic wave whose frequency is located within the second frequency band cannot flow through the first resonant circuit 31 in the high impedance state. In this case, the first resonant circuit 31 approximates an insulator.

Figure 8:
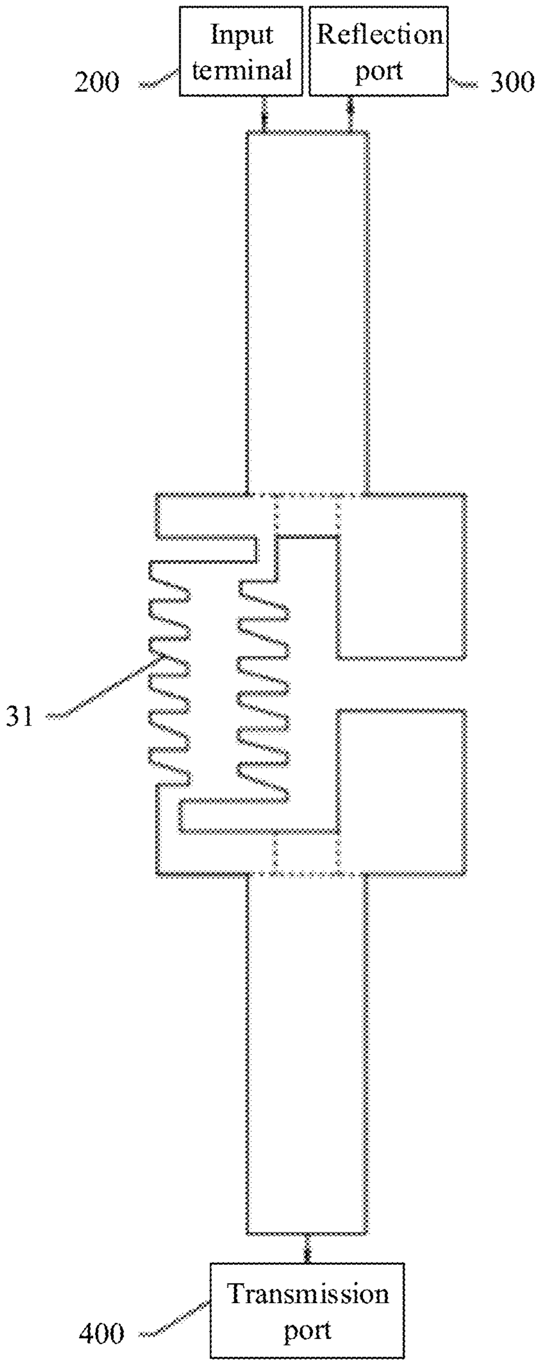
FIG. 8 is a schematic diagram of a structure of performing simulation design by using the first resonant circuit shown in FIG. 5 as a transmission line.
Figure 9:
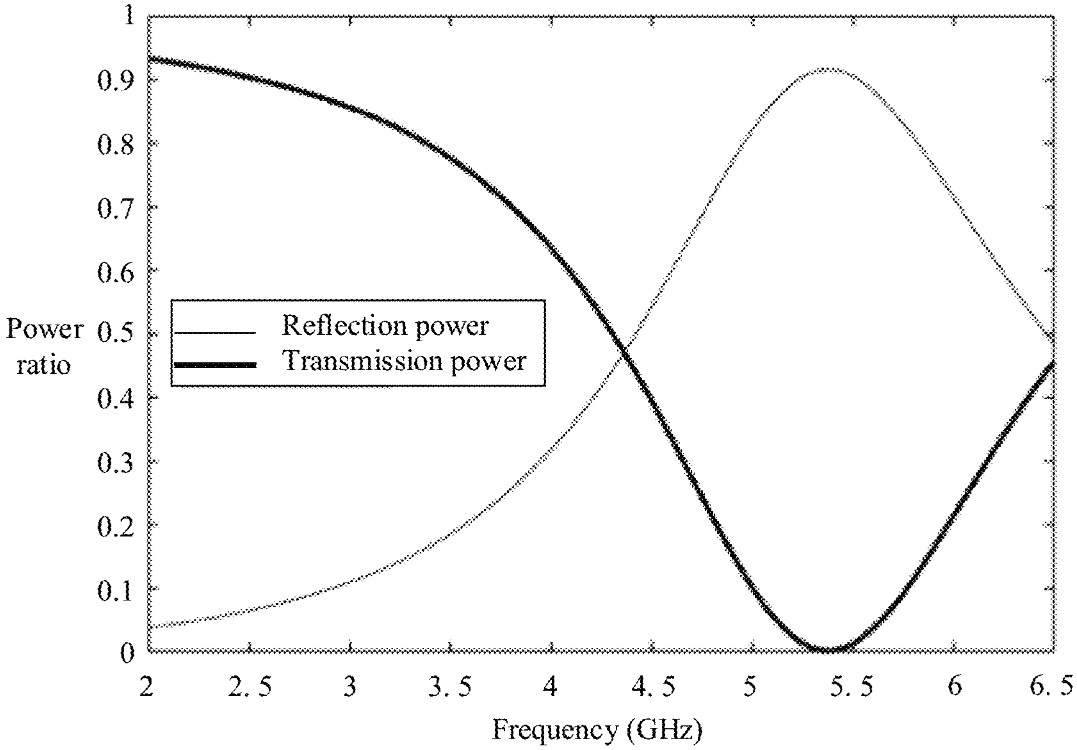
FIG. 9 is a dual-port S parameter curve diagram obtained by performing a simulation test on the structure shown in FIG. 8.

Referring to FIG. 8 and FIG. 9. FIG. 8 is a schematic diagram of a structure of performing simulation design by using the first resonant circuit 31 shown in FIG. 5 as a transmission line. FIG. 9 is a dual-port S parameter curve diagram obtained by performing a simulation test on the structure shown in FIG. 8. In the structure shown in FIG. 9, an example in which the resonance frequency of the first resonant circuit 31 is between 5.15 GHz to 5.85 GHz is used for description.

The transmission line includes an input terminal 200, and the input terminal 200 is configured to input, to the transmission line, a simulated electromagnetic signal whose frequency is 2 GHz to 6.5 GHz. A reflection port 300 is disposed near the input terminal 200, to receive a simulated electromagnetic signal reflected by the first resonant circuit 31. A transmission port 400 is disposed on the other end of the transmission line opposite to the input terminal 200, to receive a simulated electromagnetic signal that passes through the first resonant circuit 31. It can be seen from FIG. 8 that, near a 2.4 GHz frequency, the first resonant circuit 31 has a small reflection power and a large transmission power for an electromagnetic signal. That is, the reflection port 300 receives fewer simulated electromagnetic signals and the transmission port 400 receives more simulated electromagnetic signals, which indicates that the simulated electromagnetic signal input from the input terminal 200 can pass through the first resonant circuit 31 and reach the transmission port 400. This means the first resonant circuit 31 is in a low impedance state near 2.4 GHz. Within a frequency band of 5.15 GHz to 5.85 GHz, the first resonant circuit 31 has a large reflection power and a small transmission power for an electromagnetic signal. That is, the reflection port 300 receives more simulated electromagnetic signals and the transmission port 230 receives fewer simulated electromagnetic signals. It indicates that the simulated electromagnetic signal input from the input terminal 200 cannot pass through the first resonant circuit 31 and cannot reach the transmission port 400 in this case, but is basically reflected to the reflection port 300. This means the first resonant circuit 31 is in a high impedance state within the frequency band of 5.15 GHz to 5.85 GHz.

When the operating frequency band of the first element 21 is about 2.4 GHz and the operating frequency band of the second element 22 is within 5.15 GHz to 5.85 GHz, if the electromagnetic wave transmitted by the first element 21 is transmitted to the first reflector 3, because the resonance frequency of the first resonant circuit 31 is within 5.15 GHz to 5.85 GHz, the first resonant circuit 31 is in a low impedance state and approximates a conductor. If the electromagnetic wave transmitted by the second element 22 is transmitted to the first reflector 3, the first resonant circuit 31 resonates and is in a high impedance state, and approximates an insulator.

Referring back to FIG. 2, the first reflector 3 further includes a control switch 32. The control switch 32 is connected in series to the first resonant circuit 31, and is electrically connected between the first resonant circuit 31 and the conductive layer 41. Specifically, the control switch 32 is disposed on the bearing surface 401, to control a conduction state between the first resonant circuit 31 and the conductive layer 41, that is, to control a conduction state between the first reflector 3 and the conductive layer 41. A mechanical length of the control switch 32 is L32 in the X-axis direction. In an implementation, the control switch 32 is a PIN-type diode. In another implementation, the control switch may be alternatively a switch that can switch between conduction and disconnection states, such as a micro electro mechanical system (MEMS) switch or an optoelectronic switch.

In this embodiment, the first reflector 3 includes the first resonant circuit 31 and the control switch 32. A mechanical length L3 of the first reflector 3 is equal to a sum of a mechanical length L31 of the first resonant circuit 31 and a mechanical length L32 of the control switch 32. In other words, L3 is equal to L31+L32. Specifically, a sum of an electrical length of the first resonant circuit 31 and an electrical length of the control switch 32 is equal to or slightly greater than one quarter of the wavelength of the first frequency band. In other words, L31+L32 is equal to or slightly greater than $\lambda_1/4$. In other words, L3 is equal to or slightly greater than $\lambda_1/4$. In this case, an electrical length of a mirror image that is of the first reflector 3 and that is at the conductive layer 41 is also equal to or slightly greater than one quarter of the wavelength of the first frequency band. In addition, the electrical length of the control switch 32 is less than one quarter of the wavelength of the second frequency band. In other words, L32 is less than $\lambda_2/4$. In addition, an equivalent electrical length of the control switch 32 is less than one half of the wavelength of the second frequency band.

When the control switch 32 is closed, the first resonant circuit 31 is electrically connected to the conductive layer 41, that is, a state between the first reflector 3 and the conductive layer 41 is a conducting state. The equivalent electrical length of the first reflector 3 is equal to a sum of an electrical length of the first reflector 3 and the electrical length of the mirror image that is of the first reflector 3 and that is at the conductive layer 41, that is, the equivalent electrical length of the first reflector 3 is twice the electrical length of the first reflector 3. If the electromagnetic wave transmitted by the first element 21 is transmitted to the first reflector 3, the first resonant circuit 31 approximates a conductor, an induced current generated on the first reflector 3 by the electromagnetic wave whose frequency is within the first frequency band may flow between the first resonant circuit 31 and the control switch 32, and both the electrical length of the first reflector 3 and the electrical length of the mirror image that is of the first reflector 3 and that is at the conductive layer 41 are equal to or slightly greater than one quarter of the wavelength of the first frequency band. Because the first reflector 3 is electrically connected to the mirror image of the first reflector 3 at the conductive layer 41, the equivalent electrical length of the first reflector 3 is equal to or slightly greater than one half of the wavelength of the first frequency band, and the first reflector 3 reflects the electromagnetic wave transmitted by the first element 21. If the electromagnetic wave transmitted by the second element 22 is transmitted to the first reflector 3, the first resonant circuit 31 approximates an insulator, and the electromagnetic wave whose frequency is located within the second frequency band can only generate an induced current on the control switch 32. Because the electrical length of the control switch 32 is less than one quarter of the wavelength of the second frequency band, that is, because the equivalent electrical length of the control switch 32 is less than one half of the wavelength of the second frequency band, the first reflector 3 does not reflect the electromagnetic wave transmitted by the second element 22, so that the first reflector 3 is transparent to the electromagnetic wave transmitted by the second element 22.

When the control switch 32 is opened, the first resonant circuit 31 is disconnected from the conductive layer 41, that is, a state between the first reflector 3 and the conductive layer 41 is a disconnected state. If the electromagnetic wave transmitted by the first element 21 is transmitted to the first reflector 3, the electrical length of the first reflector 3 is equal to or slightly greater than one quarter of the wavelength of the first frequency band. Because the first reflector 3 is disconnected from the mirror image of the first reflector 3 at the conductive layer 41, the first reflector 3 does not reflect the electromagnetic wave transmitted by the first element 21. If the electromagnetic wave transmitted by the second element 22 is transmitted to the first reflector 3, the first resonant circuit 31 approximates an insulator. In this case, only the control switch 32 in the first reflector 3 generates an induced current. Because the electrical length of the control switch 32 is less than one quarter of the wavelength of the second frequency band, and the control switch 32 is disconnected from a mirror image that is of the control switch 32 and that is at the conductive layer 41, the first reflector 3 does not reflect the electromagnetic wave transmitted by the second element 22, so that the first reflector 3 is transparent to the electromagnetic wave transmitted by the second element 22.

It can be learned from this that, when the directional antenna 10 shown in this embodiment operates, conduction and disconnection between the first reflector 3 and the conductive layer 41 may be controlled based on a specific requirement, so as to control whether the first reflector 3 reflects the electromagnetic wave transmitted by the first element 21, and determine whether the directional antenna 10 generates an omni-directional beam or a directional beam within the first frequency band, which does not affect the generation of an omni-directional beam within the second frequency band by the directional antenna 10.

In this embodiment, there are two first reflectors 3. The two first reflectors 3 are respectively located on a left side and a right side of the active element 2, and a distance $D_1$ between each first reflector 3 and the first element 21 approximates $\lambda_1/4$. When a control switch 32 of the first reflector 3 on the left side is closed and an electromagnetic wave transmitted by the first element 21 is transmitted to the first reflector 3 on the left side, constructive interference occurs, on the right side of the first element 21, between an electromagnetic wave induced by the first reflector 3 on the left side and the electromagnetic wave transmitted by the first element 21, so that a resultant total field is strengthened. At the same time, destructive interference occurs on a left side of the first element 21 between the electromagnetic wave induced by the first reflector 3 on the left side and the electromagnetic wave transmitted by the first element 21, so that a resultant total field is weakened. That is, the first reflector 3 on the left side reflects, to the right side, the electromagnetic wave transmitted by the first element 21. In this case, the directional antenna 10 generates a rightward directional beam within the first frequency band. When a control switch 32 of the first reflector 3 on the right side is closed and an electromagnetic wave transmitted by the first element 21 is transmitted to the first reflector 3 on the right side, constructive interference occurs, on the left side of the first element 21, between an electromagnetic wave induced by the first reflector 3 on the right side and the electromagnetic wave transmitted by the first element 21, so that a resultant total field is strengthened. At the same time, destructive interference occurs, on the right side of the first element 21 between the electromagnetic wave induced by the first reflector 3 on the right side and the electromagnetic wave transmitted by the first element 21, so that a resultant total field is weakened. That is, the first reflector 3 on the right side reflects, to a left side, the electromagnetic wave transmitted by the first element 21. In this case, the directional antenna 10 generates a leftward directional beam within the first frequency band. Therefore, when the directional antenna 10 shown in this embodiment operates, conduction and disconnection between the two first reflectors 3 and the conductive layer 41 may be further separately controlled based on a specific requirement, so as to determine a specific direction of a directional beam generated by the directional antenna 10 within the first frequency band.

Figure 10A:
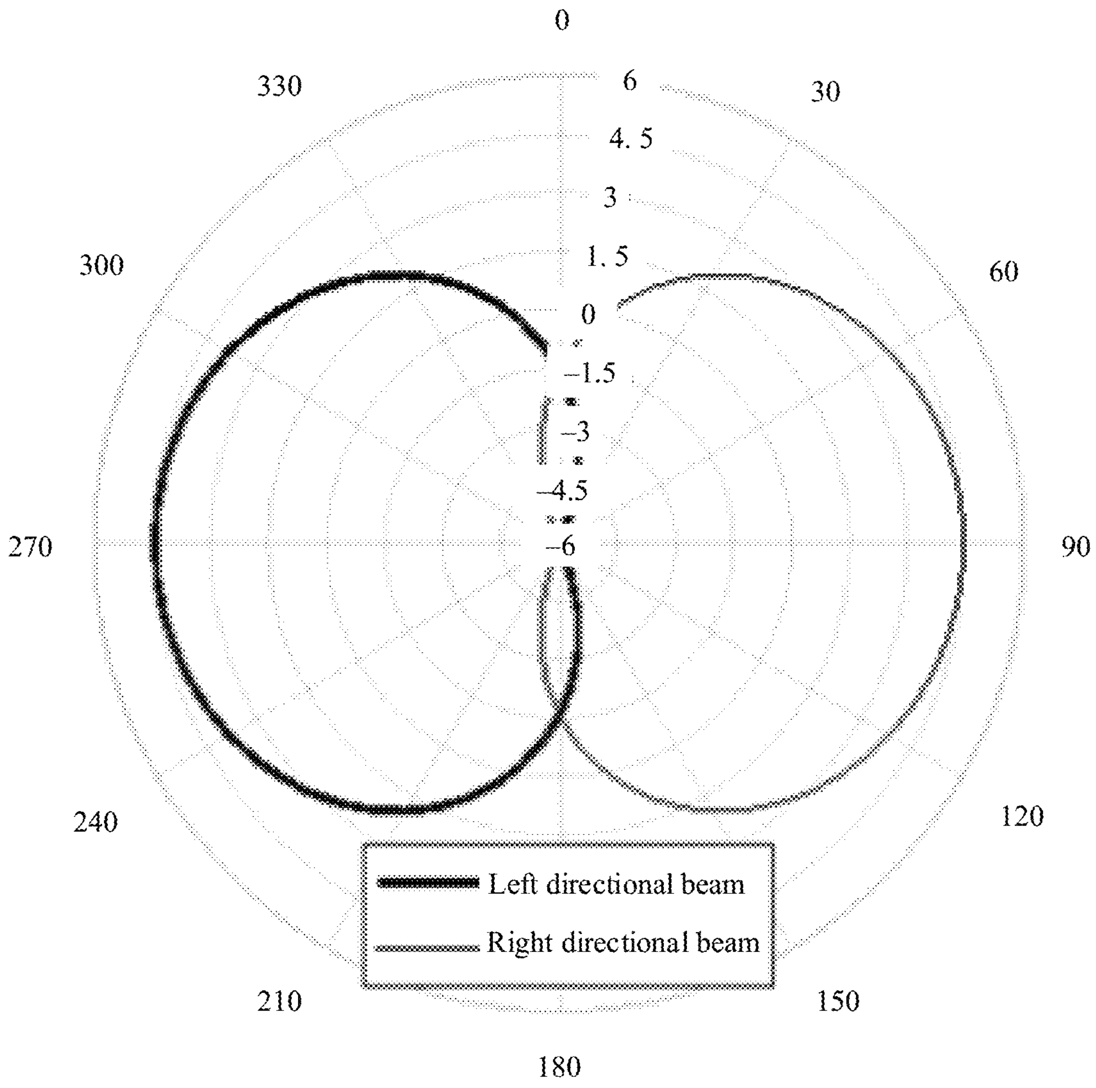
FIG. 10A is a diagram of a beam direction of the directional antenna shown in FIG. 2 at 2.4 GHz.
Figure 10B:
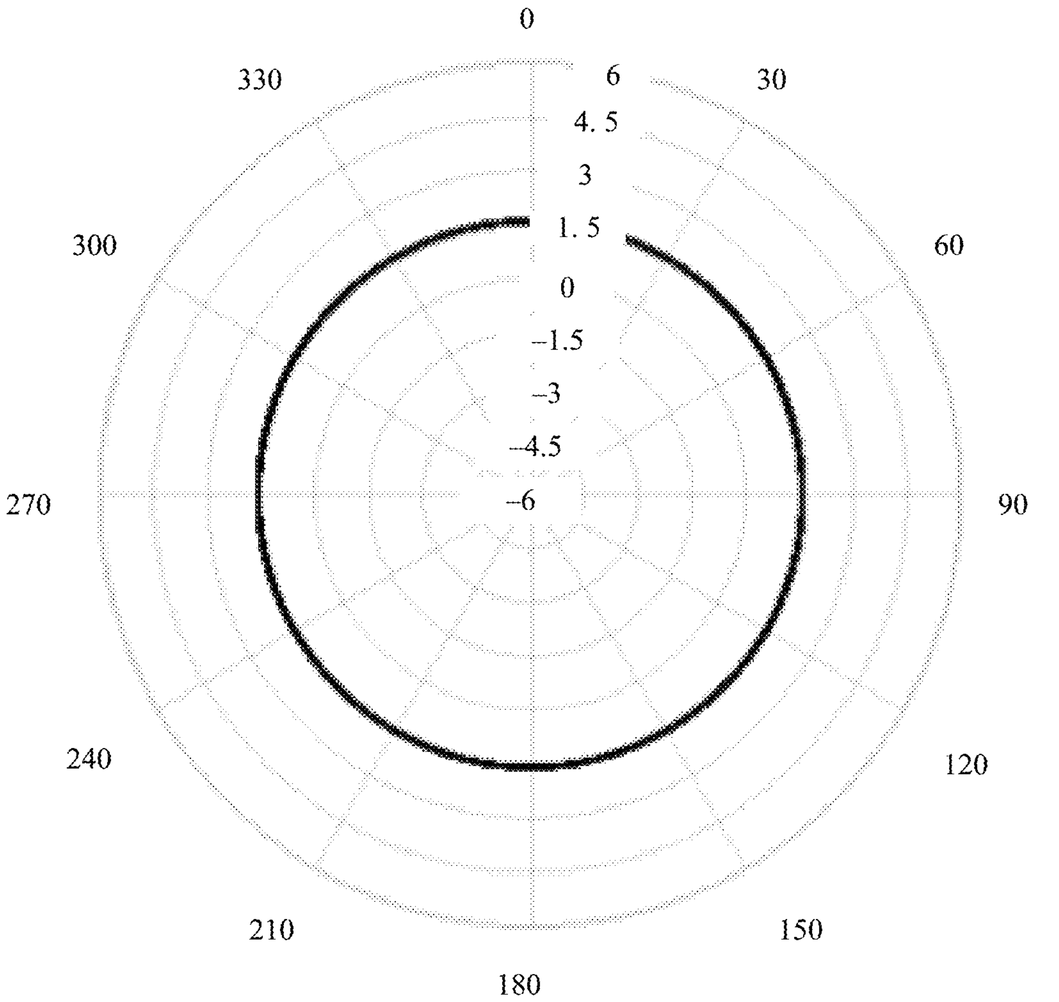
FIG. 10B is a diagram of a beam direction of the directional antenna shown in FIG. 2 at 5 GHz.

Refer to FIGS. 10A and 10B. FIG. 10A is a diagram of a beam direction of the directional antenna 10 shown in FIG. 2 at 2.4 GHz. FIG. 10B is a diagram of a beam direction of the directional antenna 10 shown in FIG. 2 at 5 GHz. The first frequency band is 2.4 GHz, and the second frequency band is 5.15 GHz to 5.85 GHz.

When the control switch 32 of the first reflector 3 on the right side is closed, that is, when a state between the first reflector 3 on the right side and the conductive layer 41 is a conducting state for operation, and an electromagnetic wave of frequency 2.4 GHz transmitted by the first element 21 is transmitted to the first reflector 3 on the right side, the first reflector 3 on the right side reflects the electromagnetic wave of 2.4 GHz to the left side. In this case, the directional antenna 10 generates a leftward directional beam at 2.4 GHz, thereby increasing a gain of the directional antenna 10 on the left side. When the control switch 32 of the first reflector 3 on the left side is closed, that is, when a state between the first reflector 3 on the left side of the active element 2 and the conductive layer 41 is a conducting state for operation, and an electromagnetic wave of 2.4 GHz is transmitted to the first reflector 3 on the left side, the first reflector 3 on the left side reflects the electromagnetic wave of 2.4 GHz to the right side. In this case, the directional antenna 10 generates a rightward directional beam at 2.4 GHz, thereby increasing a gain of the directional antenna 10 on the right side. In addition, when the first reflectors 3 located on the left and right sides of the active element 2 are electrically connected to the conductive layer 41, both the two first reflectors 3 are transparent to an electromagnetic wave whose frequency is 5 GHz. In this case, the directional antenna 10 generates an omni-directional beam at 5 GHz.

In this embodiment, the mounting plate 1 is disposed on the bearing surface 401 and is disposed perpendicular to the floor 4. In an implementation, a material of the conductive layer 41 disposed on the bearing surface 401 is a metal material. In other words, the conductive layer 41 is a metal layer. In another implementation, the material of the conductive layer may alternatively be another conductor, or the material of the floor may be the same conductor as the material of the conductive layer, and the floor and the conductive layer may be a metal sheet formed integrally, so as to simplify the production process of the directional antenna and reduce the production costs of the directional antenna. In another embodiment, the mounting plate may not be perpendicular to the floor, that is, the included angle between the first mounting surface and the bearing surface may be less than 90 degrees. This is not specifically limited in this application.

The conductive layer 41 reflects the active element 2 and the first reflector 3 as a mirror. Based on the mirror image principle of an electromagnetic wave, the equivalent electrical length of the first element 21 of the active element 2 is equal to the sum of the electrical length of the first element 21 and the electrical length of the mirror image that is of the first element 21 and that is at the conductive layer 41, that is, the equivalent electrical length of the first element 21 is twice the electrical length of the first element 21. That is, the electromagnetic wave whose frequency is located within the first frequency band may be transmitted or received, provided that the electrical length of the first element 21 is equal to one quarter of the wavelength of the first frequency band. Similarly, the electromagnetic wave whose frequency is located within the second frequency band may be transmitted or received, provided that the electrical length of the second element 22 of the active element 2 is equal to one quarter of the wavelength of the second frequency band; and the first reflector 3 may reflects the electromagnetic wave transmitted by the first element 21, provided that the electrical length of the first reflector 3 is equal to or slightly greater than one quarter of the wavelength of the first frequency band.

In other words, in the directional antenna 10 shown in this embodiment, the conductive layer 41 is used to mirror the active element 2 and the first reflector 3, so that an equivalent electrical length of the active element 2 and the equivalent electrical length of the first reflector 3 are respectively twice the electrical length of the active element 2 and the electrical length of the first reflector 3. This is equivalent to reducing the mechanical length of the active element 2 and the mechanical length of the first reflector 3 by half. Therefore, a size of the directional antenna 10 is reduced. This not only reduces preparation costs of the directional antenna 10, but also improves the compactness of the structure of the directional antenna 10, thereby facilitating miniaturizing the design of the directional antenna 10. In another embodiment, the mounting plate may be not perpendicular to the floor, that is, the included angle between the bearing surface and the first mounting surface may be less than 90 degrees, provided that the electrical length of the active element and the electrical length of the first reflector are adaptively adjusted so that the active element and the first reflector can normally operate.

In another embodiment, if the conductive layer configured to mirror the active element and the first reflector is not disposed on the floor, the directional antenna should use an actual conductor structure to supplement the electrical length of the active element and the electrical length of the first reflector, so that the electrical length of the active element and the electrical length of the first reflector are respectively equal to the equivalent electrical length of the active element and the equivalent electrical length of the first reflector.

When the directional antenna 10 shown in this embodiment operates, the radio frequency module 30 sends an electromagnetic signal to the feed point 21 by using the feeder. After receiving the electromagnetic signal, the active element 2 radiates an electromagnetic wave outward. When the control switch 32 of the first reflector 3 on the left side is closed so that the state between the first reflector 3 and the conductive layer 41 is a conducting state, and the electromagnetic wave transmitted by the first element 21 in the active element 2 is propagated to the first reflector 3, the first resonant circuit 31 of the first reflector 3 does not resonate and is in a conducting state. In this case, the equivalent electrical length of the first reflector 3 is equal to or slightly greater than one half of the wavelength of the first frequency band, and the first reflector 3 resonates to directionally reflect, to the right, the electromagnetic wave transmitted by the first element 21, thereby enhancing the gain of the directional antenna 10 on the right side and improving the communication quality. When the electromagnetic wave transmitted by the second element 22 in the active element 2 is propagated to the first reflector 3, the first resonant circuit 31 resonates and is in a disconnected state, thereby blocking flowing of an induced current on the first reflector 3. In this case, the electromagnetic wave transmitted by the second element 22 can be normally propagated after passing through the first reflector 3, that is, the first reflector 3 does not distort the electromagnetic wave transmitted by the second element 22. An operating process of the first reflector 3 on the right side is basically the same as an operating process of the first reflector 3 on the left side. The only difference lies in that the first reflector 3 on the right side directionally reflects, to the left, the electromagnetic wave transmitted by the first element 21. Details are not described herein. In other words, in the directional antenna 10 shown in this embodiment of this application, the first reflector 3 not only can reflect the electromagnetic wave transmitted by the first element 21, but also can remain transparent to the electromagnetic wave transmitted by the second element 22 without distorting the electromagnetic wave transmitted by the second element 22. Because the first reflector 3 may selectively reflect the electromagnetic wave whose frequency is located within the first frequency band, the beam modes of the directional antenna 10 within the first frequency band and the second frequency band are independent of each other, and the directional antenna 10 may operate within the dual frequency bands based on the independent directional modes.

Figure 11:
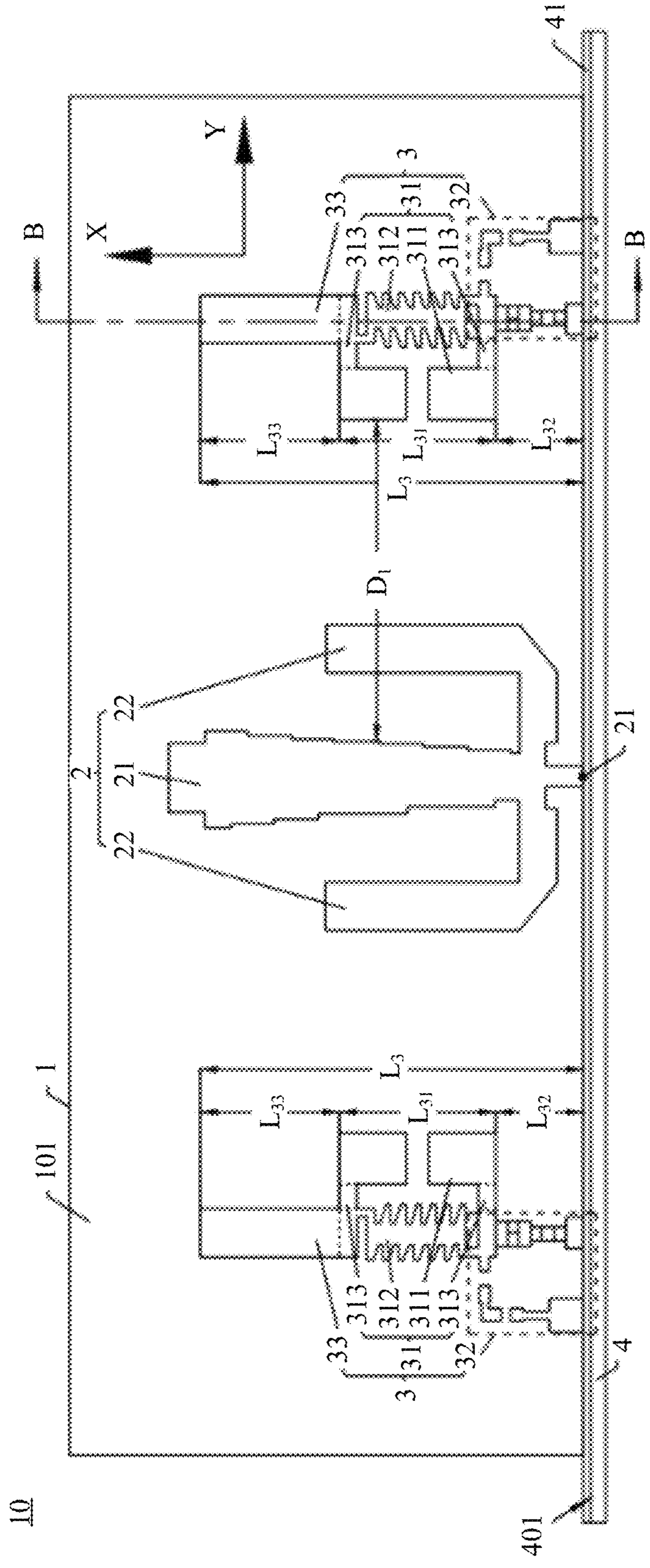
FIG. 11 is a schematic diagram of a structure of a second directional antenna according to an embodiment of this application.
Figure 12:
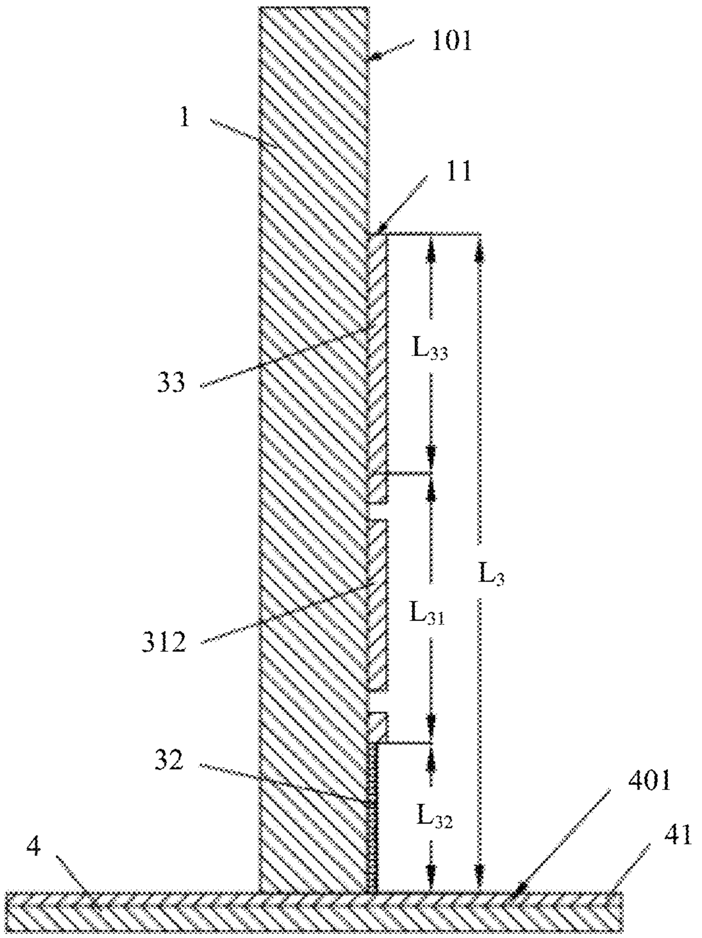
FIG. 12 is a schematic diagram of a cross-sectional structure of the directional antenna shown in FIG. 11 in a direction B-B.

Refer to FIG. 11 and FIG. 12. FIG. 11 is a schematic diagram of a structure of a second directional antenna 10 according to an embodiment of this application. FIG. 12 is a schematic diagram of a cross-sectional structure of the directional antenna 10 shown in FIG. 11 in a direction B-B. The directional antenna 10 corresponds to the directional antenna 10 in the communication device 100 shown in FIG. 1.

A difference between the directional antenna 10 in this embodiment and the directional antenna 10 shown in the foregoing embodiment lies in that a first reflector 3 further includes a conductive part 33, where the conductive part 33 is connected in series to a first resonant circuit 31, the first resonant circuit 31 is connected between the conductive part 33 and a control switch 32, and an equivalent electrical length of the first reflector 3 minus an equivalent electrical length of the conductive part 33 is less than one half of a wavelength of a first frequency band. Specifically, the conductive part 33 is located within a first functional layer 11, that is, the conductive part 33 may also be formed in a same process with an active element 2, and no additional process is needed to make the conductive part 33, thereby reducing production costs of the directional antenna 10. In another embodiment, the conductive part may be alternatively connected between the first resonant circuit and the control switch. This is not specifically limited in this application.

In an implementation, the conductive part 33 is connected to a first inductive part 312 of the first resonant circuit 31, that is, the first inductive part 312 is connected between the conductive part 33 and the control switch 32. The conductive part 33 extends in an X-axis direction, and a mechanical length of the conductive part 33 in the X-axis direction is L33. In another implementation, the first capacitive part may be alternatively connected between the conductive part and the control switch. This is not specifically limited in this embodiment.

In this embodiment, the first reflector 3 includes the first resonant circuit 31, the control switch 32, and the conductive part 33. A mechanical length L3 of the first reflector 3 is equal to a sum of a mechanical length L31 of the first resonant circuit 31, a mechanical length L32 of the control switch 32, and the mechanical length L33 of the conductive part 33. In other words, L3 is equal to L31+L32+L33. Specifically, a sum of an electrical length of the first resonant circuit 31, an electrical length of the control switch 32, and an electrical length of the conductive part 33 is equal to or slightly greater than one quarter of the wavelength of the first frequency band. In other words, L31+L32+L33 is equal to or slightly greater than $\lambda_1/4$. In other words, L3 is equal to or slightly greater than $\lambda_1/4$. In addition, both the electrical length of the control switch 32 and the electrical length of the conductive part 33 are less than one quarter of a wavelength of a second frequency band. In other words, both L32 and L33 are less than $\lambda_2/4$. In addition, both an equivalent electrical length of the control switch 32 and an equivalent electrical length of the conductive part 33 are less than one half of the wavelength of the second frequency band, so as to prevent the control switch 32 and the conductive part 33 from reflecting an electromagnetic wave transmitted by a second element 22, so that the first reflector 3 is transparent to the electromagnetic wave transmitted by the second element 22.

That is, when a sum of an equivalent electrical length of the first resonant circuit 31 and the equivalent electrical length of the control switch 32 is less than one half of a wavelength $\lambda_1$ of the first frequency band, that is, when a sum of the electrical length of the first resonant circuit 31 and the electrical length of the control switch 32 is less than one quarter of the wavelength of the first frequency band, the length of the first reflector 3 in the X-axis direction may be increased by adding to the conductive part 33, that is, the mechanical length of the first reflector 3 is increased. It is equivalent to adding to the electrical length of the first reflector 3, so as to supplement the equivalent electrical length of the first reflector 3 and enable the equivalent electrical length of the first reflector 3 to be equal to or slightly greater than one half of the wavelength of the first frequency band. Therefore, an electromagnetic wave transmitted by a first element 21 can be reflected, thereby implementing directional reflection of the electromagnetic wave transmitted by the first element 21.

In another embodiment, there may be a plurality of conductive parts. Some of the conductive parts are connected to the first capacitive part, and the remaining conductive parts are connected to the first inductive part. The quantity of the conductive parts is not specifically limited in this application. Because the functions of the plurality of conductive parts are the same as those of the conductive part in the foregoing embodiment, details are not described herein.

Figure 13:
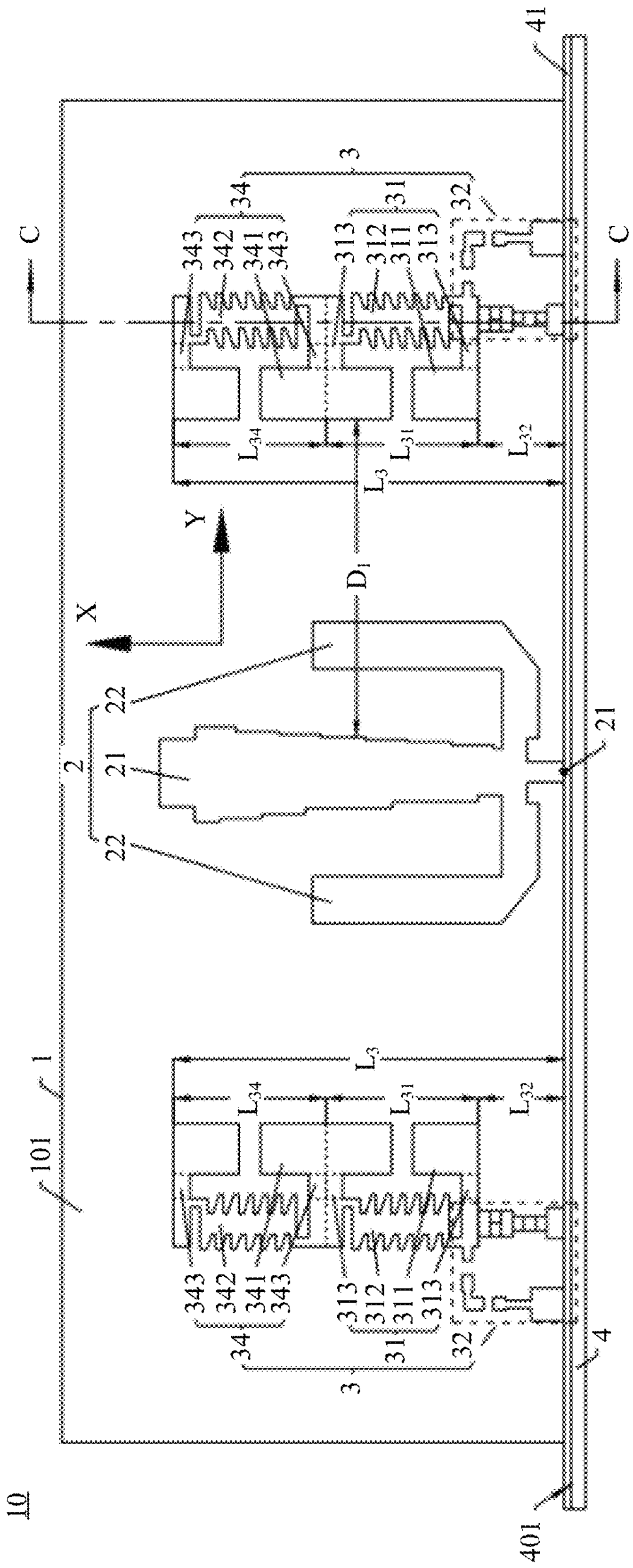
FIG. 13 is a schematic diagram of a structure of a third directional antenna according to an embodiment of this application.
Figure 14:
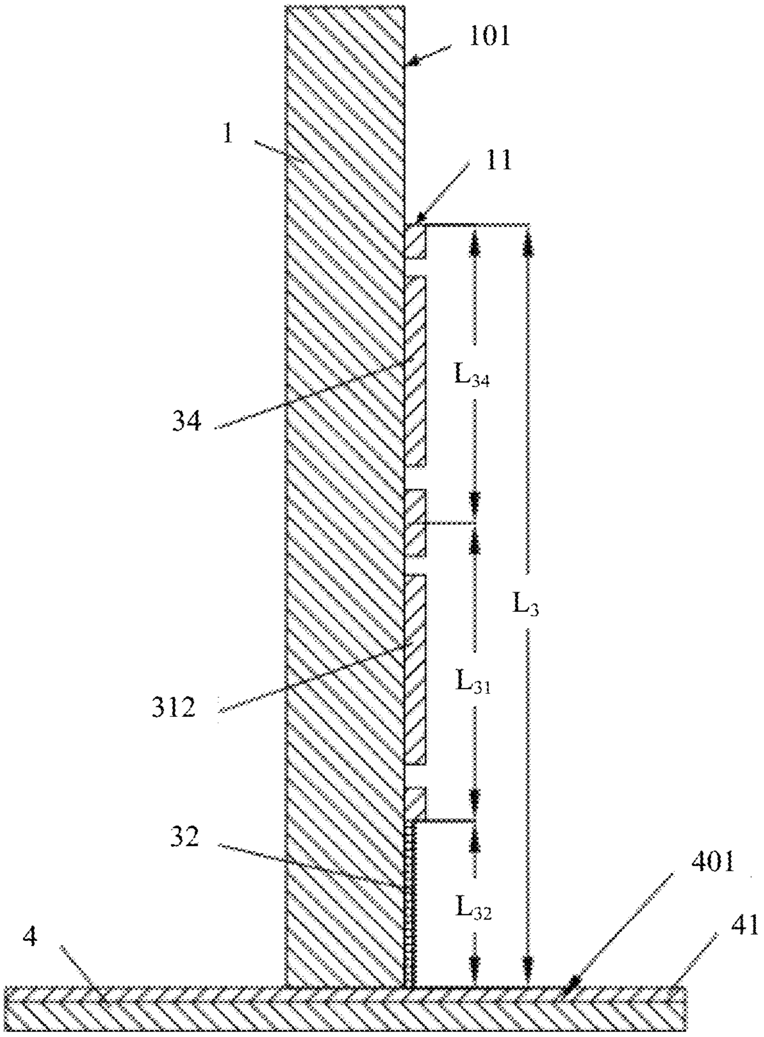
FIG. 14 is a schematic diagram of a cross-sectional structure of the directional antenna shown in FIG. 13 in a direction C-C.

In referring to FIG. 13 and FIG. 14, FIG. 13 is a schematic diagram of a structure of a third directional antenna 10 according to an embodiment of this application. FIG. 14 is a schematic diagram of a cross-sectional structure of the directional antenna 10 shown in FIG. 13 in a direction C-C. The directional antenna 10 corresponds to the directional antenna 10 in the communication device 100 shown in FIG. 1.

A difference between the directional antenna 10 shown in this embodiment and the directional antennas 10 shown in the foregoing two embodiments lies in that an active element 2 further includes a third element (not shown in the figure), and an operating frequency band of the third element is a third frequency band. A first reflector 3 further includes a second resonant circuit 34 connected in series to a first resonant circuit 31, where the second resonant circuit 34 includes a second capacitive part 341 and a second inductive part 342 that are connected in parallel, and a resonance frequency of the second resonant circuit 34 is located within the third frequency band.

In this embodiment, there are two third elements. The two third elements are symmetrically distributed on two sides of a first element 21, and there is a gap between each third element and the first element 21. Specifically, the third element extends in an X-axis direction, and an equivalent electrical length of the third element is equal to one half of a wavelength of the third frequency band, so as to transmit and receive an electromagnetic wave whose frequency is located within the third frequency band. A sum of an electrical length of the third element and an electrical length of a mirror image that is of the third element and that is at a conductive layer 41 is equal to the equivalent electrical length of the third element. That is, twice the electrical length of the third element is equal to the equivalent electrical length of the third element, or, the electrical length of the third element is equal to one quarter of the wavelength of the third frequency band. In an implementation, the minimum frequency within the third frequency band is greater than the maximum frequency of a second frequency band. In other words, the operating frequency band of the third element is higher than an operating frequency band of a second element and an operating frequency band of the first element. In another implementation, the maximum frequency within the third frequency band may be alternatively less than the minimum frequency of the second frequency band. In other words, the operating frequency band of the third element is lower than the operating frequency band of the second element. This is not specifically limited in this embodiment.

The first resonant circuit 31 is connected between a control switch 32 and the second resonant circuit 34. The second resonant circuit 34 extends in the X-axis direction, so as to reduce a size of the first reflector 3 in a Y-axis direction, that is, reduce a horizontal size of the first reflector 3, thereby improving the compactness of the structure of the directional antenna 10. Specifically, the second resonant circuit 34 is located within a first functional layer 11 and may be formed in a same process with the active element 2, and no additional process is needed to form the second resonant circuit 34, thereby reducing production costs of the directional antenna 10. In addition, the second resonant circuit 34 is a physical structure located on a first mounting surface 101, and can be mounted on the first mounting surface 101 without an additional welding process, thereby effectively avoiding a parasitic effect caused by a process such as welding. In another embodiment, the second resonant circuit may be alternatively connected between the first resonant circuit and the control switch, and the second resonant circuit may alternatively include electronic components connected to each other. For example, the second capacitive part of the second resonant circuit may be an electronic component that functions as a capacitor or the like, and the second inductive part may be an electronic component that functions as an inductor or the like, provided that an equivalent electrical length of the first reflector is equal to or slightly greater than one half of a wavelength of a first frequency band, and an electromagnetic wave generated by the first element can be reflected.

Both the second capacitive part 341 and the second inductive part 342 in the second resonant circuit 34 are physical structures located on the first mounting surface 101. The structure of the second capacitive part 341 is similar to the structure of the first capacitive part 311. In this embodiment, the second capacitive part 341 includes two metal blocks disposed at an interval and a slot located between the two metal blocks. Specifically, the length directions of the two metal blocks are parallel to the X-axis direction, and the slot is a linear slot extending in the Y-axis direction, so as to reduce a size of the second capacitive part 341 in the Y-axis direction, further reduce a size of the second resonant circuit 34 in the Y-axis direction, and further reduce a size of the second reflector 5 in the Y-axis direction. In another embodiment, the second capacitive part may alternatively include at least three metal blocks and the slots among these metal blocks, and a shape of the slot includes but is not limited to a shape such as a straight line, a broken line, or a curve.

The second inductive part 342 is located on a right side of the second capacitive part 341, and there is a gap between the second inductive part 342 and the second capacitive part 341. The structure of the second inductive part 342 is similar to the structure of the first inductive part 312, and the second inductive part 342 includes a metal wire of a waveform. In this embodiment, a length direction of the second inductive part 342 is parallel to the X-axis direction, so as to reduce a size of the second inductive part 342 in the Y-axis direction, reduce the size of the second resonant circuit 34 in the Y-axis direction, and further reduce the size of the second reflector 5 in the Y-axis direction. Specifically, the second inductive part 342 and the second capacitive part 341 are disposed directly opposite to each other, and a size of the second inductive part 342 is the same as a size of the second capacitive part 341 in the X-axis direction, that is, a size L34 of the second resonant circuit 34 in the X-axis direction is equal to the size of the second inductive part 342 or the size of the second capacitive part 341 in the X-axis direction. The waveform of the metal wire included in the second inductive part 342 includes but is not limited to any waveform such as a rectangular wave or a sinusoidal wave. In another embodiment, the second inductive part and the second capacitive part may not be disposed opposite to each other. A location relationship between the second inductive part and the second capacitive part is not specifically limited in this application, provided that the second inductive part is connected in parallel to the second capacitive part.

The second resonant circuit 34 further includes second connectors 343 connected between the second inductive part 342 and the second capacitive part 341. In this embodiment, there are two second connectors 343. The two second connectors 343 are respectively connected to two ends of the second capacitive part 341 and two ends of the second inductive part 342, and are integrally formed with the second capacitive part 341 and the second inductive part 342, so that the second capacitive part 341 and the second inductive part 342 are connected in parallel by using the second connectors 343. Specifically, one second connector 343 is connected to one metal block 3411 of the second capacitive part 341 and one end of the second inductive part 342. The other second connector 343 is connected to the other metal block 3411 of the second capacitive part 341 and the other end of the second inductive part 342. In another embodiment, there may be more than two second connectors, and the more than two second connectors are respectively connected to the two ends of the second capacitive part and the two ends of the second inductive part. The quantity of the second connectors is not specifically limited in this application, provided that the second inductive part is connected in parallel to the second capacitive part.

Because the resonance frequency of the second resonant circuit 34 is located within the third frequency band, the resonance frequency of the second resonant circuit 34 is far away from the first frequency band and the second frequency band. When an electromagnetic wave whose frequency is located within the first frequency band or the second frequency band is transmitted to the first reflector 3, because the resonance frequency of the second resonant circuit 34 is far away from the first frequency band and the second frequency band, the second resonant circuit 34 does not resonate and is in a low impedance state. A current generated on the first reflector 3 by the electromagnetic wave whose frequency is located within the first frequency band or the second frequency band may flow through the second resonant circuit 34 in the low impedance state. In this case, the second resonant circuit 34 approximates a conductor. When an electromagnetic wave whose frequency is located within the third frequency band is transmitted to the first reflector 3, because the resonance frequency of the second resonant circuit 34 is located within the third frequency band, the second resonant circuit 34 resonates and is in a high impedance state, and a current generated on the first reflector 3 by the electromagnetic wave whose frequency is located within the third frequency band cannot flow through the second resonant circuit 34 in the high impedance state. In this case, the first resonant circuit 31 approximates an insulator.

In the directional antenna 10 shown in this embodiment, because a resonance frequency of the first resonant circuit 31 is different from the resonance frequency of the second resonant circuit 34, a capacitance value of the first capacitive part 311 may be the same as or different from a capacitance value of the second capacitive part 341. That is, a width of the slot of the first capacitive part 311 may be the same as or different from a width of the slot of the second capacitive part 341. Similarly, an inductance value of the first inductive part 312 may be the same as or different from an inductance value of the second inductive part 342. That is, a width of the metal wire of the first inductive part 312 may be the same as or different from a width of the metal wire of the second inductive part 342. This is not specifically limited in this application, provided that the resonance frequency of the first resonant circuit 31 is different from the resonance frequency of the second resonant circuit 34. In another embodiment, the active element may include more than three elements that have different operating frequency bands, and the first reflector may alternatively include more than two resonant circuits that are connected in series. A resonance frequency of each resonant circuit is located within an operating frequency band of an element, so that the first reflector can selectively reflect an electromagnetic wave of a specific frequency band among more than three frequency bands. Therefore, the beam modes of the directional antenna within the more than three frequency bands are independent of each other, and the directional antenna may operate within the more than three frequency bands based on independent directional modes.

In this embodiment, the first reflector 3 includes the first resonant circuit 31, the control switch 32, and the second resonant circuit 34. A mechanical length L3 of the first reflector 3 is equal to a sum of a mechanical length L31 of the first resonant circuit 31, a mechanical length L32 of the control switch 32, and a mechanical length L34 of the second resonant circuit 34. In other words, L3 is equal to L31+L32+L34. Specifically, a sum of an electrical length of the first resonant circuit 31, an electrical length of the control switch 32, and an electrical length of the second resonant circuit 34 is equal to or slightly greater than one quarter of the wavelength of the first frequency band. In other words, L31+L32+L34 is equal to or slightly greater than $\lambda_1/4$. In other words, L3 is equal to or slightly greater than $\lambda_1/4$. In this case, an electrical length of a mirror image that is of the first reflector 3 and that is at the conductive layer 41 is also equal to or slightly greater than one quarter of the wavelength of the first frequency band. In addition, both the electrical length of the control switch 32 and the electrical length of the second resonant circuit 34 are less than one quarter of a wavelength of the second frequency band. In other words, both L32 and L34 are less than $\lambda_2/4$. In addition, both an equivalent electrical length of the control switch 32 and an equivalent electrical length of the second resonant circuit 34 are less than one half of the wavelength of the second frequency band. In addition, a sum of the electrical length of the first resonant circuit 31 and the electrical length of the control switch 32 is less than one quarter of the wavelength of the third frequency band. In other words, L31+L32 is less than $\lambda_3/4$. In addition, an equivalent electrical length of the first resonant circuit 31 and the equivalent electrical length of the control switch 32 are less than one half of the wavelength of the third frequency band.

When a control switch 32 of a first reflector 3 on the left side is closed so that a state between the first reflector 3 and the conductive layer 41 is a conducting state, and an electromagnetic wave transmitted by the first element 21 is transmitted to the first reflector 3 on the left side, because both the first resonant circuit 31 and the second resonant circuit 34 approximate conductors, an induced current generated on the first reflector 3 on the left side by an electromagnetic wave whose frequency is within the first frequency band may flow through the first resonant circuit 31, the control switch 32, and the second resonant circuit 34. Both an electrical length L3/$\lambda_1$ of the first reflector 3 on the left side and an electrical length of a mirror image that is of the first reflector 3 on the left side and that is at the conductive layer 41 are equal to or slightly greater than one half of the wavelength of the first frequency band. Because the first reflector 3 on the left side is connected to the mirror image that is of the first reflector 3 on the left side and that is at the conductive layer 41, an equivalent electrical length of the first reflector 3 on the left side is equal to or slightly greater than one half of the wavelength of the first frequency band, the first reflector 3 on the left side reflects, to the a right side, the electromagnetic wave transmitted by the first element 21, and the directional antenna 10 generates a rightward directional beam within the first frequency band.

When an electromagnetic wave transmitted by a second element 22 is transmitted to the first reflector 3 on the left side, the first resonant circuit 31 approximates an insulator, and the second resonant circuit 34 approximates a conductor. The first resonant circuit 31 blocks an induced current generated on the first reflector 3 on the left side by an electromagnetic wave whose frequency is located within the second frequency band, and an induced current can be generated only on the control switch 32 and the second resonant circuit 34. It is equivalent to that the first reflector 3 is divided into two parts: the control switch 32 and the second resonant circuit 34. Because both the electrical length of the control switch 32 and the electrical length of the second resonant circuit 34 are less than one quarter of the wavelength of the second frequency band, both the equivalent electrical length of the control switch 32 and the equivalent electrical length of the second resonant circuit 34 are less than one half of the wavelength of the second frequency band, and both the control switch 32 and the second resonant circuit 34 do not reflect the electromagnetic wave transmitted by the second element 22, so that the first reflector 3 on the left side is transparent to the electromagnetic wave transmitted by the second element 22, and the directional antenna 10 generates an omni-directional beam within the second frequency band.

When an electromagnetic wave transmitted by the third element is transmitted to the first reflector 3 on the left side, the first resonant circuit 31 approximates a conductor, the second resonant circuit 34 approximates an insulator, the second resonant circuit 34 blocks an induced current generated on the first reflector 3 on the left side by an electromagnetic wave whose frequency is located within the third frequency band, and an induced current can be generated only on the first resonant circuit 31 and the control switch 32. Because the sum of the electrical length of the first resonant circuit 31 and the electrical length of the control switch 32 is less than one quarter of the wavelength of the third frequency band, that is, because a sum of the equivalent electrical length of the first resonant circuit 31 and the equivalent electrical length of the control switch 32 is less than one half of the wavelength of the third frequency band, the first resonant circuit 31 and the control switch 32 do not reflect the electromagnetic wave transmitted by the third element, so that the first reflector 3 is transparent to the electromagnetic wave transmitted by the third element, and the directional antenna 10 generates an omni-directional beam within the third frequency band.

An operating process of a first reflector 3 on a right side is basically the same as an operating process of the first reflector 3 on the left side. The only difference lies in that the first reflector 3 on the right side reflects, to the left, the electromagnetic wave transmitted by the first element 21. In this case, the directional antenna 10 generates a leftward beam within the first frequency band. Details are not described herein. That is, in the directional antenna 10 shown in this embodiment, the first reflector 3 can reflect the electromagnetic wave transmitted by the first element 21, and does not cause interference such as relatively strong reflection and scattering to the electromagnetic wave transmitted by the second element 22 and the electromagnetic wave transmitted by the third element. Therefore, the electromagnetic wave transmitted by the second element 22 and the electromagnetic wave transmitted by the third element are not distorted. Because the first reflector 3 may selectively reflect an electromagnetic wave of a specific frequency band among the three frequency bands, the beam modes of the directional antenna 10 within the first frequency band, the second frequency band, and the third frequency band are independent of each other, and the directional antenna 10 may operate within the three frequency bands based on independent directional modes.

Figure 15:
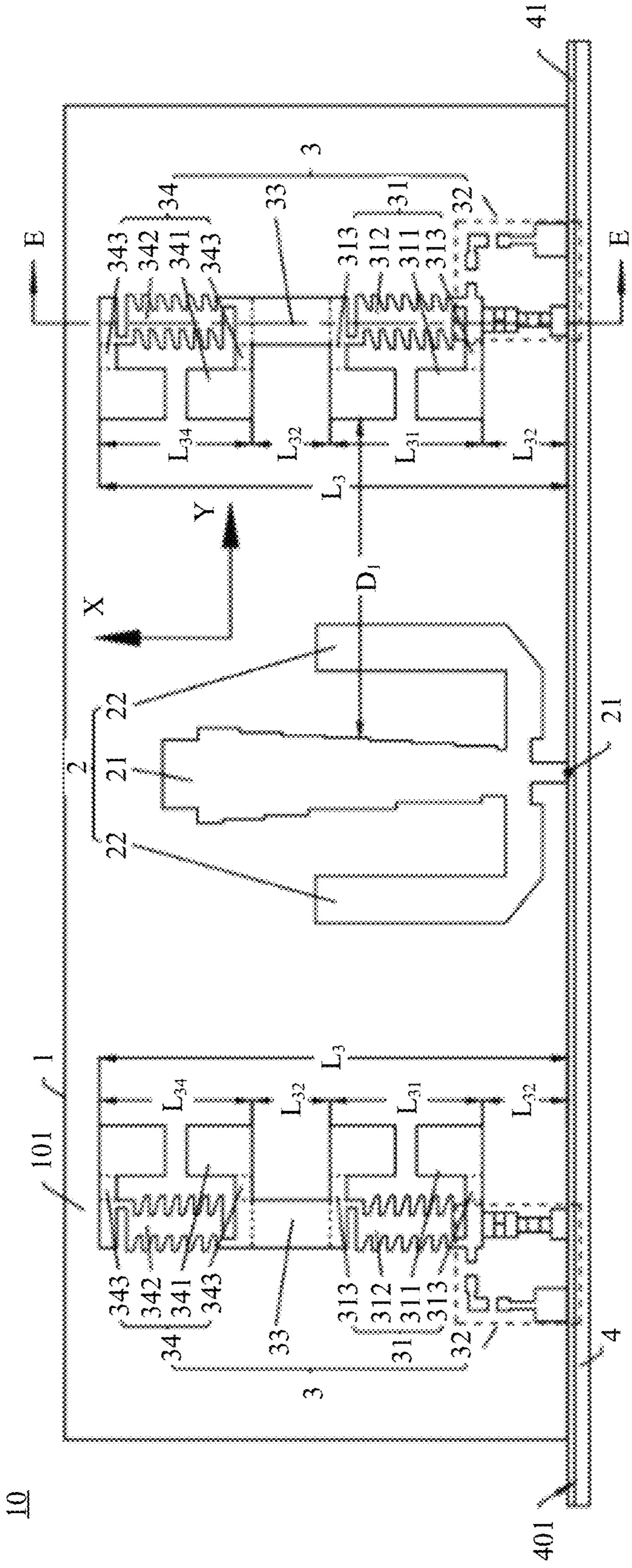
FIG. 15 is a schematic diagram of a structure of a fourth directional antenna according to an embodiment of this application.
Figure 16:
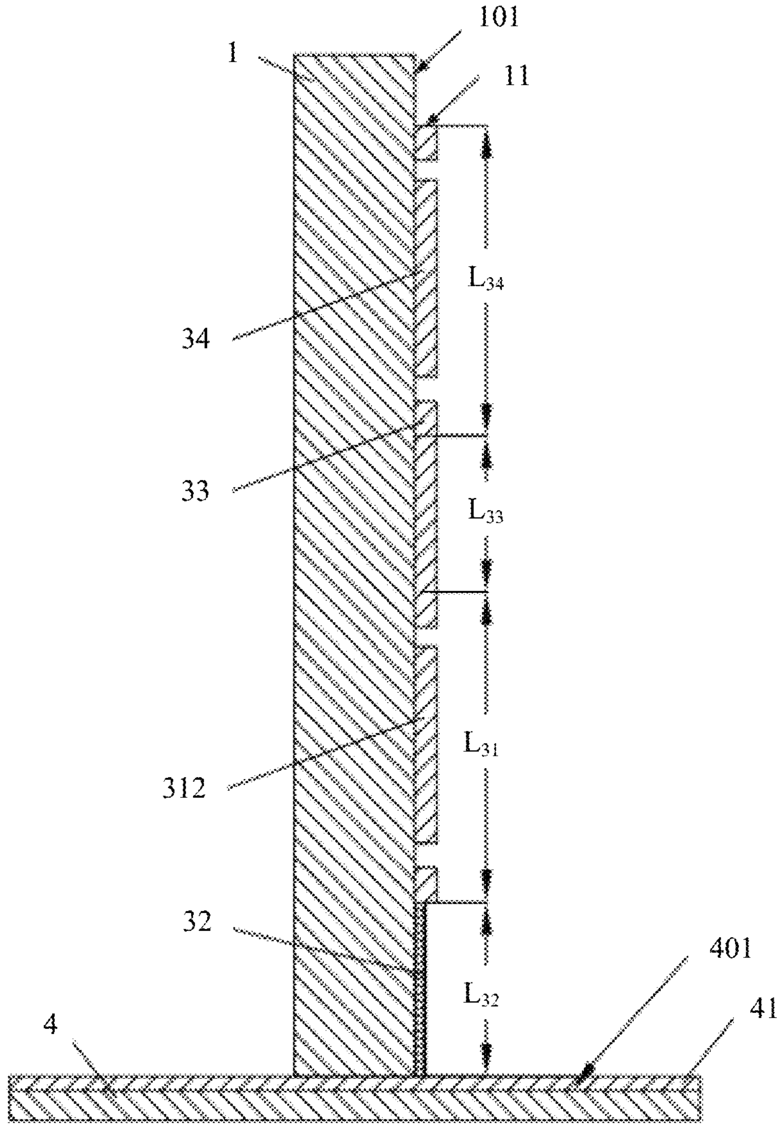
FIG. 16 is a schematic diagram of a cross-sectional structure of the directional antenna shown in FIG. 15 in a direction E-E.

Refer to FIG. 15 and FIG. 16. FIG. 15 is a schematic diagram of a structure of a fourth directional antenna 10 according to an embodiment of this application. FIG. 16 is a schematic diagram of a cross-sectional structure of the directional antenna 10 shown in FIG. 15 in a direction E-E. The directional antenna 10 corresponds to the directional antenna 10 in the communication device 100 shown in FIG. 1.

A difference between the directional antenna 10 shown in this embodiment and the directional antenna 10 shown in the foregoing three embodiments lies in that a first reflector 3 further includes a conductive part 33, and the conductive part 33 is connected in series to a first resonant circuit 31 and a second resonant circuit 34. In other words, the first resonant circuit 31 and the second resonant circuit 34 are connected in series by using the conductive part 33. In another embodiment, the conductive part may be alternatively connected between the first resonant circuit and a control switch. This is not specifically limited in this application.

In an implementation, the conductive part 33 is connected between a first inductive part 312 and a second inductive part 342. A size of the conductive part 33 is L33 in an X-axis direction. In another implementation, the conductive part may be alternatively connected between a first capacitive part and a second capacitive part. This is not specifically limited in this embodiment.

In this embodiment, the first reflector 3 includes the first resonant circuit 31, a control switch 32, the conductive part 33, and the second resonant circuit 34. A mechanical length L3 of the first reflector 3 is equal to a sum of a mechanical length L31 of the first resonant circuit 31, a mechanical length L32 of the control switch 32, a mechanical length L33 of the conductive part 33, and a mechanical length L34 of the second resonant circuit 34. In other words, L3 is equal to L31+L32+L33+L34. Specifically, a sum of an electrical length of the first resonant circuit 31, an electrical length of the control switch 32, an electrical length of the conductive part 33, and an electrical length of the second resonant circuit 34 is equal to or slightly greater than one quarter of a wavelength of a first frequency band. In other words, L31+L32+L33+L34 is equal to or slightly greater than $\lambda_1/4$. In other words, L3 is equal to or slightly greater than $\lambda_1/4$. In addition, both the electrical length of the control switch 32 and a sum of the electrical length of the conductive part 33 and the electrical length of the second resonant circuit 34 are less than one quarter of a wavelength of a second frequency band. In other words, both L32 and L33+L34 are less than $\lambda_1/4$. That is, both an equivalent electrical length of the control switch 32 and a sum of an equivalent electrical length of the conductive part 33 and an equivalent electrical length of the second resonant circuit 34 are less than one half of the wavelength of the second frequency band, so as to prevent the control switch 32, the conductive part 33, and the second resonant circuit 34 from reflecting an electromagnetic wave transmitted by a second element 22, so that the first reflector 3 is transparent to the electromagnetic wave transmitted by the second element 22. In addition, a sum of the electrical length of the first resonant circuit 31, the electrical length of the control switch 32, and the electrical length of the conductive part 33 is less than one quarter of a wavelength of a third frequency band. In other words, L31+L32+L33 is less than $\lambda_1/4$. That is, a sum of an equivalent electrical length of the first resonant circuit 31, the equivalent electrical length of the control switch 32, and the equivalent electrical length of the conductive part 33 is less than one half of the wavelength of the third frequency band, so as to prevent the first resonant circuit 31, the control switch 32, and the conductive part 33 from reflecting an electromagnetic wave transmitted by a third element, so that the first reflector 3 is transparent to the electromagnetic wave transmitted by the third element.

Figure 17:
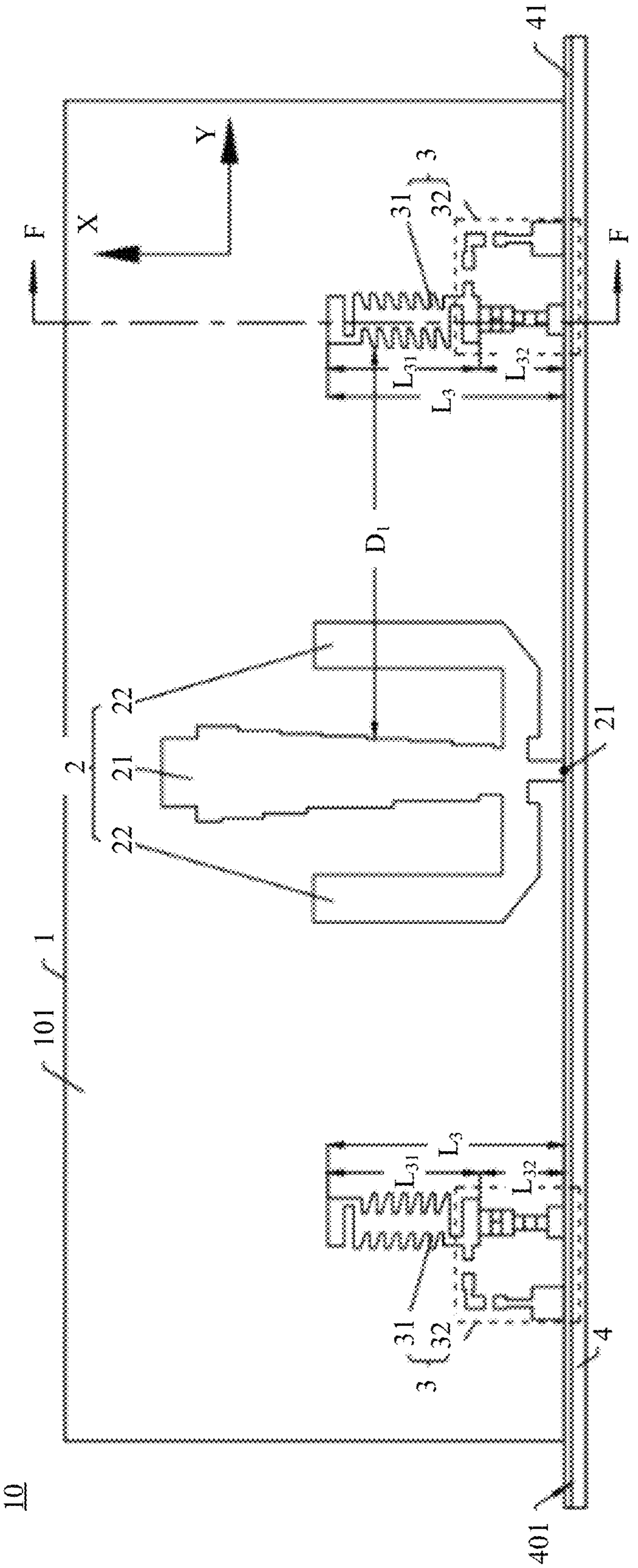
FIG. 17 is a schematic diagram of a structure of a fifth directional antenna according to an embodiment of this application.
Figure 18:
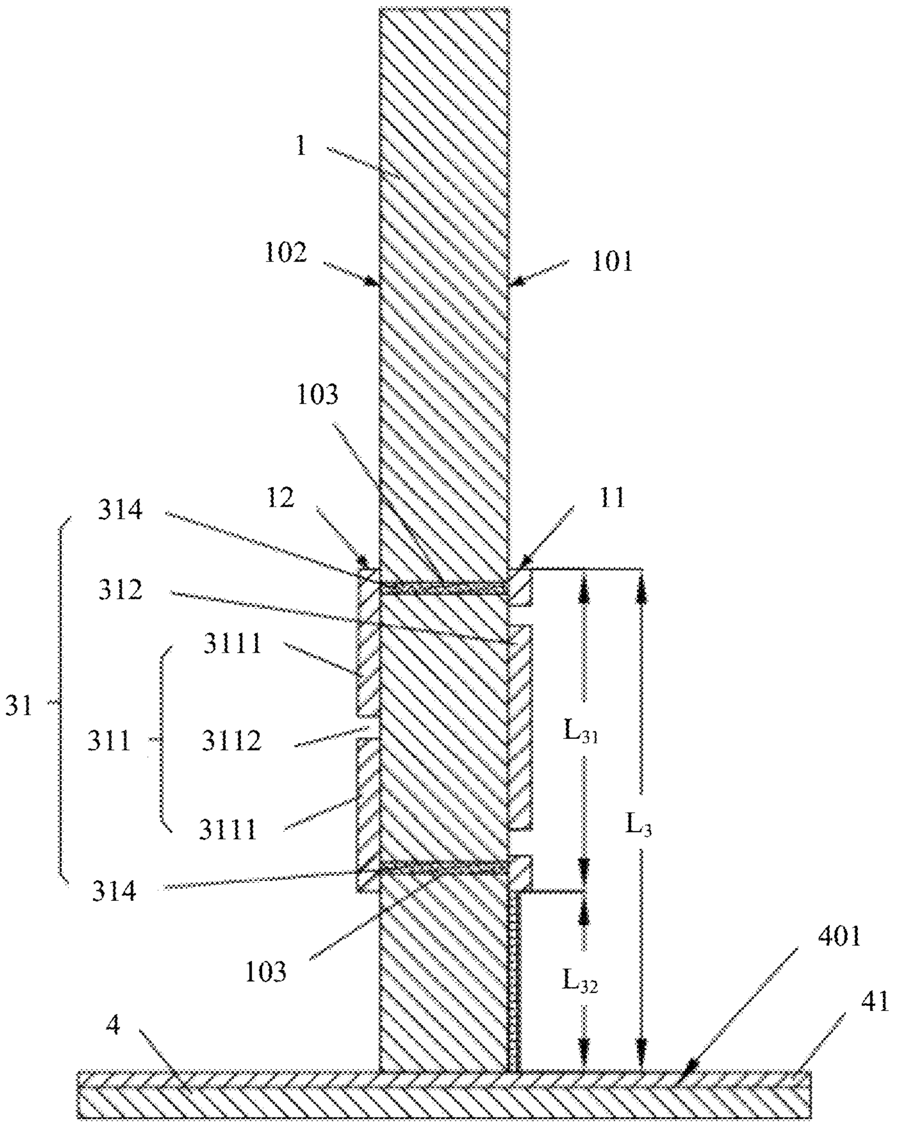
FIG. 18 is a schematic diagram of a cross-sectional structure of the directional antenna shown in FIG. 17 in a direction F-F.

Refer to FIG. 17 and FIG. 18. FIG. 17 is a schematic diagram of a structure of a fifth directional antenna 10 according to an embodiment of this application. FIG. 18 is a schematic diagram of a cross-sectional structure of the directional antenna 10 shown in FIG. 17 in a direction F-F. The directional antenna 10 corresponds to the directional antenna 10 in the communication device 100 shown in FIG. 1.

A difference between the directional antenna 10 shown in this embodiment of this application and the directional antennas 10 shown in the foregoing four embodiments lies in that a mounting plate 1 further includes a second mounting surface 102 opposite to a first mounting surface 101, where a second functional layer 12 is disposed on the second mounting surface 102, a first capacitive part 311 and a first inductive part 312 of a first resonant circuit 31 are respectively located within a first functional layer 11 and the second functional layer 12, and the first capacitive part 311 and the first inductive part 312 are disposed directly opposite to each other. In another embodiment, both the first capacitive part and the first inductive part may be located within the second functional layer.

In this embodiment, two first through-holes 103 are provided on the mounting plate 1, both the two first through-holes 103 run through the first mounting surface 101 and the second mounting surface 102, and there is a gap between the two first through-holes 103. Specifically, a material of the second functional layer 12 disposed on the second mounting surface 102 may be metallic copper. In other words, the second functional layer 12 is a copper layer disposed on the second mounting surface 102. In an implementation, the second functional layer 12 is printed on the second mounting surface 102. In another embodiment, the material of the second functional layer may alternatively be another conductor. This is not specifically limited in this application.

The first inductive part 312 and an active element 2 are located within the first functional layer 11, and the first capacitive part 311 is located within the second functional layer 12. In this embodiment, a size of the first inductive part 312 is the same as a size of the first capacitive part 311 in both an X-axis direction, and a Y-axis direction. The first inductive part 312 and the first capacitive part 311 are disposed directly opposite to each other, that is, a projection of the first inductive part 312 on the second functional layer 12 just covers the first capacitive part 311, that is, a projection of the first capacitive part 311 on the first functional layer 11 just covers the first inductive part 312, so as to further reduce a size of the first resonant circuit 31 in the Y-axis direction, that is, reduce a horizontal size of the first resonant circuit 31, and further reduce a horizontal size of the first reflector 3, thereby improving compactness of a structure of the directional antenna 10.

Figure 19:
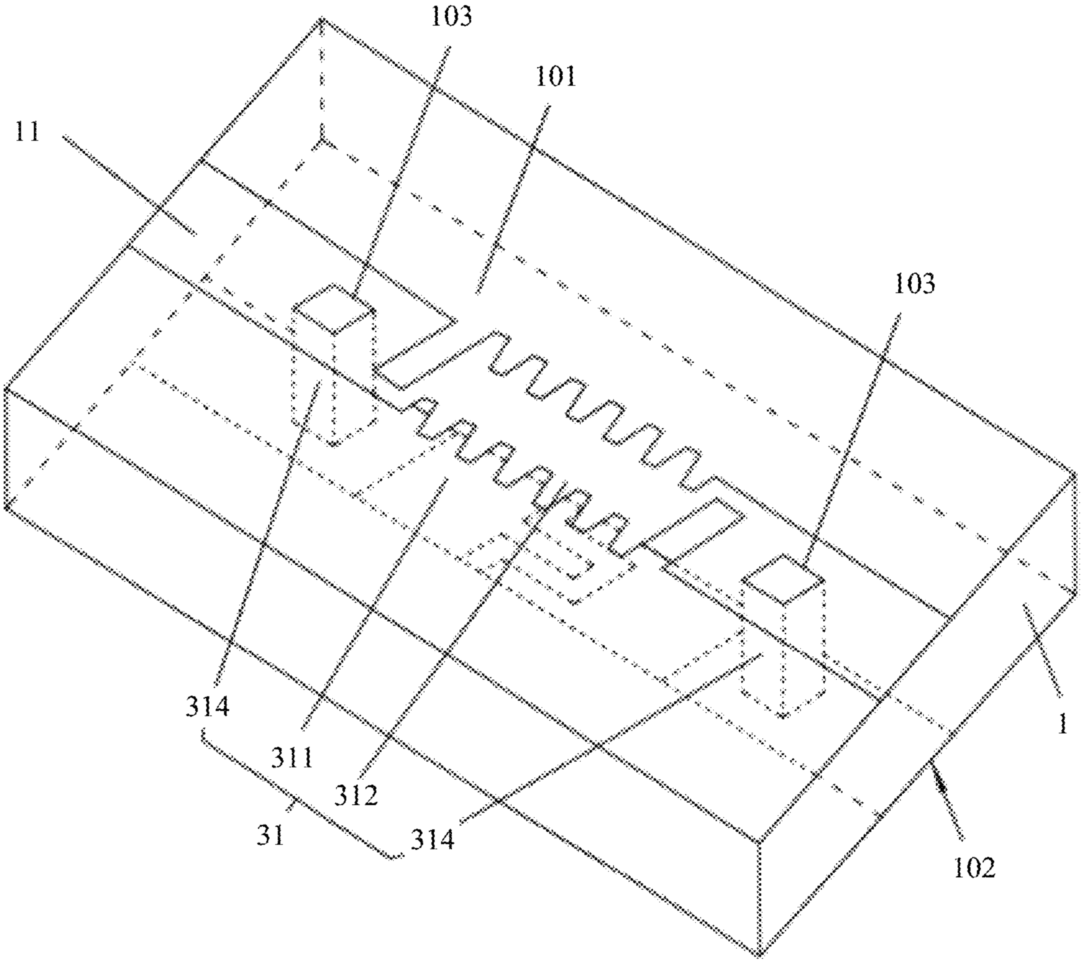
FIG. 19 is a schematic diagram of a partial structure of the directional antenna 10 shown in FIG. 17.

FIG. 19 is a schematic diagram of a partial structure of the directional antenna 10 shown in FIG. 17.

In this embodiment, the first resonant circuit 31 further includes two first conductive columns 314, and the two first conductive columns 314 are respectively filled in the two first through-holes 103, so as to electrically connect the two ends of the first capacitive part 311 and the two ends of the first inductive part 312, so that the first capacitive part 311 and the first inductive part 312 are connected in parallel. In an implementation, the material of the first conductive column 314 is metal. In another implementation, the material of the first conductive column may alternatively be another conductive material. Certainly, the first conductive column may be a structure with a conductive function, such as a conductive wire, provided that the first capacitive part and the first inductive part can be connected in parallel. This is not specifically limited in this application.

In another embodiment, there may be more than two first through-holes provided on the mounting plate, the first resonant circuit may alternatively include more than two first conductive columns, and each first conductive column is filled in one first through-hole, so that the first capacitive part and the first inductive part are connected in parallel. This is not specifically limited in this application.

Figure 20:
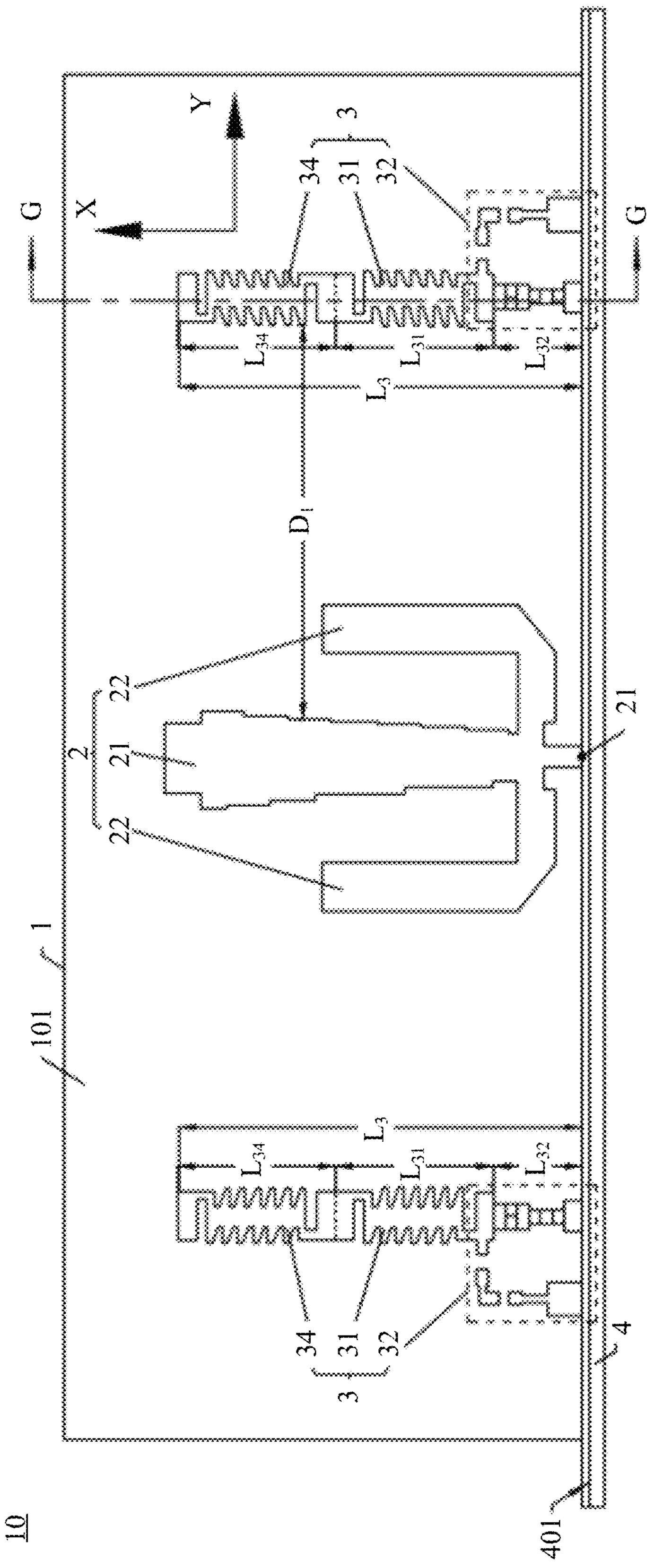
FIG. 20 is a schematic diagram of a structure of a sixth directional antenna according to an embodiment of this application.
Figure 21:
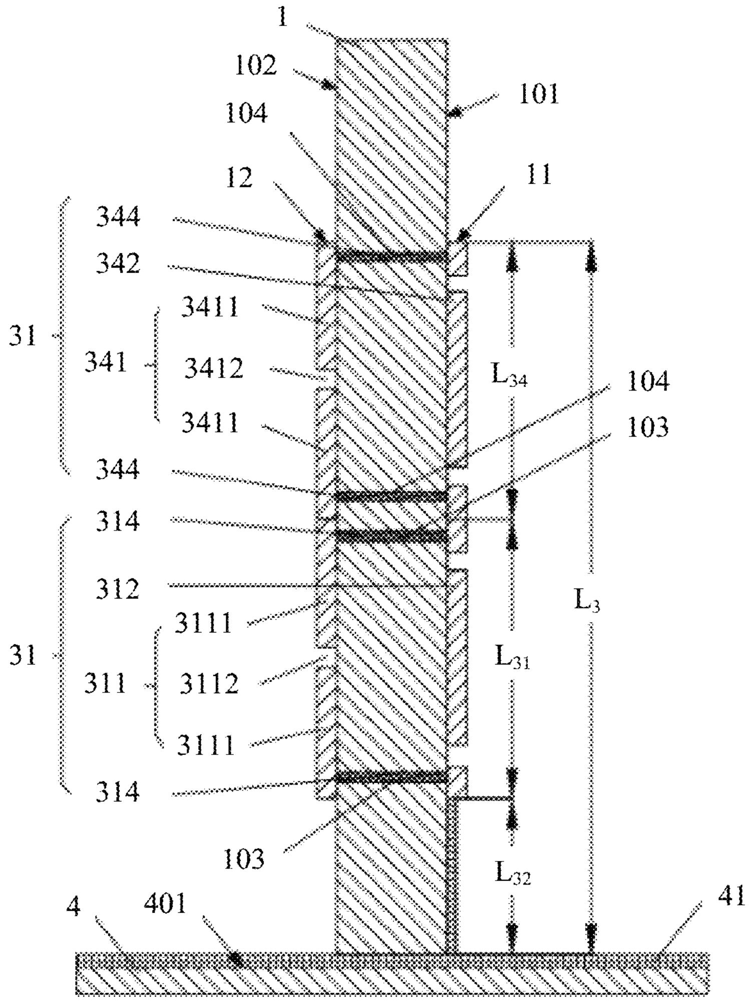
FIG. 21 is a schematic diagram of a cross-sectional structure of the directional antenna shown in FIG. 20 in a direction G-G.

Refer to FIG. 20 and FIG. 21. FIG. 20 is a schematic diagram of a structure of a sixth directional antenna 10 according to an embodiment of this application. FIG. 21 is a schematic diagram of a cross-sectional structure of the directional antenna 10 shown in FIG. 20 in the direction G-G. The directional antenna 10 corresponds to the directional antenna 10 in the communication device 100 shown in FIG. 1.

A difference between the directional antenna 10 shown in this embodiment of this application and the directional antenna 10 shown in the foregoing fifth embodiment lies in that an active element 2 further includes a third element (not shown in the figure), and an operating frequency band of the third element is a third frequency band. A first reflector 3 further includes a second resonant circuit 34 connected in series to a first resonant circuit 31, where the second resonant circuit 34 includes a second capacitive part 341 and a second inductive part 342 that are connected in parallel, and a resonance frequency of the second resonant circuit 34 is located within the third frequency band.

In this embodiment, there are two third elements. The two third elements are symmetrically distributed on two sides of a first element 21, and there is a gap between each third element and the first element 21. Specifically, the third element extends in an X-axis direction, and an equivalent electrical length of the third element is equal to one half of a wavelength of the third frequency band, so as to transmit and receive an electromagnetic wave whose frequency is located within the third frequency band. A sum of an electrical length of the third element and an electrical length of a mirror image that is of the third element and that is at a conductive layer 41 is equal to the equivalent electrical length of the third element, that is, twice the electrical length of the third element is equal to the equivalent electrical length of the third element. That is, the electrical length of the third element is equal to one quarter of the wavelength of the third frequency band. In an implementation, the minimum frequency within the third frequency band is greater than the maximum frequency of a second frequency band. In other words, the operating frequency band of the third element is higher than an operating frequency band of a second element and an operating frequency band of the first element. In another implementation, the maximum frequency within the third frequency band may be alternatively less than the minimum frequency of the second frequency band. In other words, the operating frequency band of the third element is lower than the operating frequency band of the second element. This is not specifically limited in this embodiment.

In this embodiment, the first resonant circuit 31 is connected between a control switch 32 and the second resonant circuit 34. The second resonant circuit 34 extends in the X-axis direction, so as to reduce a size of the first reflector 3 in a Y-axis direction, that is, reduce a horizontal size of the first reflector 3, thereby improving compactness of a structure of the directional antenna 10. The second capacitive part 341 and the second inductive part 342 of the second resonant circuit 34 are respectively located within a first functional layer 11 and a second functional layer 12. In another embodiment, both the second capacitive part and the second inductive part may be located within the second functional layer.

In an implementation, two first through-holes 104 are provided on a mounting plate 1, both the two first through-holes 104 run through a first mounting surface 101 and a second mounting surface 102, and there is a gap between the two first through-holes 104. Specifically, the second capacitive part 341 of the second resonant circuit 34 is located within the second functional layer 12, and the second inductive part 342 is located within the first functional layer 11. That is, both a first capacitive part 311 and the second capacitive part 341 are located within the second functional layer 12, and both the first inductive part 312 and the second inductive part 342 are located within the first functional layer 11. In another embodiment, the first capacitive part and the second capacitive part may be respectively located within the first functional layer and the second functional layer, and the first inductive part and the second inductive part may be respectively located within the first functional layer and the second functional layer. This is not specifically limited in this application.

In this implementation, a size of the second capacitive part 341 is the same as a size of the second inductive part 342 in both the X-axis direction and the Y-axis direction. The second capacitive part 341 and the second inductive part 342 are disposed directly opposite to each other. That is, a projection of the second inductive part 342 on the second functional layer 12 just covers the second capacitive part 341, meaning a projection of the second capacitive part 341 on the first functional layer 11 just covers the second inductive part 342, so as to further reduce a size of the second resonant circuit 34 in the Y-axis direction. This reduces a horizontal size of the second resonant circuit 34, and further reduces a horizontal size of a second reflector 3, thereby improving the compactness of the structure of the directional antenna 10 and facilitating miniaturizing the design of the directional antenna 10.

In this embodiment, the second resonant circuit 34 further includes two second conductive columns 344, where the two second conductive columns 344 are respectively filled in the two second through-holes 104, so as to electrically connect two ends of the second capacitive part 341 and two ends of the second inductive part 342, so that the second capacitive part 341 and the second inductive part 342 are connected in parallel. In an implementation, the material of the second conductive column 344 is metal. In another implementation, the material of the second conductive column may alternatively be another conductive material. Certainly, the second conductive column may alternatively be a structure with a conductive function, such as a conductive wire, provided that the second capacitive part and the second inductive part can be connected in parallel. This is not specifically limited in this application.

In another embodiment, there may be more than two second through-holes provided on the mounting plate, the second resonant circuit may alternatively include more than two second conductive columns, and each second conductive column is filled in one second through-hole, so that the second capacitive part and the second inductive part are connected in parallel. This is not specifically limited in this application.

Figure 22:
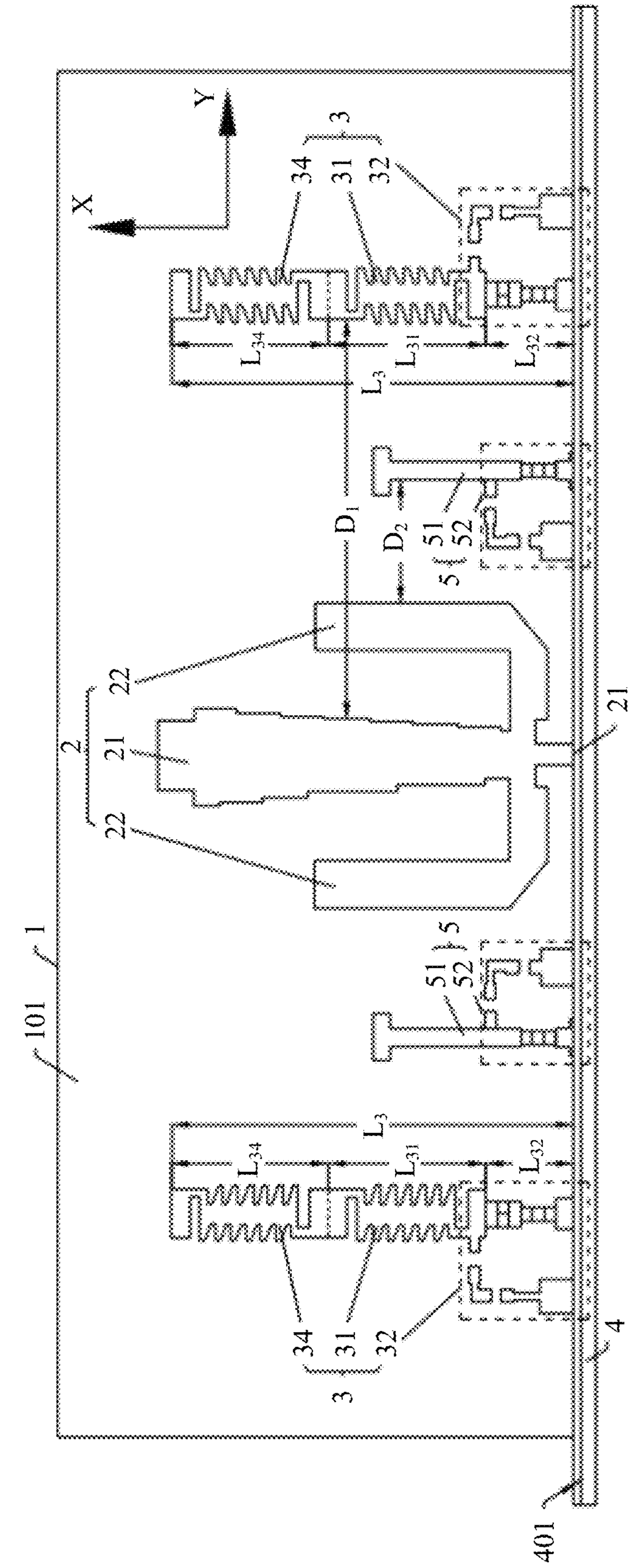
FIG. 22 is a schematic diagram of a structure of a seventh directional antenna according to an embodiment of this application.

FIG. 22 is a schematic diagram of a structure of a seventh directional antenna 10 according to an embodiment of this application. The directional antenna 10 corresponds to the directional antenna 10 in the communication device 100 shown in FIG. 1.

A difference between the directional antenna 10 shown in this embodiment and the foregoing six directional antennas 10 lies in that the directional antenna 10 further includes a second reflector 5, where an equivalent electrical length of the second reflector 5 is equal to or slightly greater than one half of a wavelength of a second frequency band, and an electromagnetic wave whose frequency is within the second frequency band resonates on the second reflector 5. In this embodiment, the equivalent electrical length of the second reflector 5 is equal to a sum of an electrical length of the second reflector 5 and an electrical length of a mirror image that is of the second reflector 5 and that is at a conductive layer 41, that is, the equivalent electrical length of the second reflector 5 is twice the electrical length of the second reflector 5. That is, the electrical length of the second reflector 5 is equal to or slightly greater than one quarter of the wavelength of the second frequency band.

The second reflector 5 is in an edge area of a first mounting surface 101, and is located between an active element 2 and a first reflector 3. Specifically, the second reflector 5 extends in an X-axis direction. The second reflector 5 includes a reflection body 51 and a selection switch 52. The reflection body 51 is located within a first functional layer 11 and may be formed in a same process with the active element 2, and no additional process is needed to form the reflection body 51, thereby reducing preparation costs of the directional antenna 10. In addition, the reflection body 51 is a physical structure formed on the first mounting surface 101, and the reflection body 51 is welded on the first mounting surface 101 without using a welding process, thereby getting rid of a preparation procedure of the directional antenna 10. The selection switch 52 is disposed on a bearing surface 401, and is electrically connected between the reflection body 51 and the conductive layer 41, so as to control a conduction state between the reflection body 51 and the conductive layer 41, that is, to control a conduction state between the second reflector 5 and the conductive layer 41. In an implementation, the selection switch 52 is a PIN-type diode. In another implementation, the selection switch may be alternatively a MEMS switch or an optoelectronic switch.

When the selection switch 52 is closed, the reflection body 51 is electrically connected to the conductive layer 41, that is, a state between the second reflector 5 and the conductive layer 41 is a conducting state. If an electromagnetic wave transmitted by a second element 22 is transmitted to the second reflector 5, because the second reflector 5 is electrically connected to the mirror image that is of the second reflector 5 and that is at the conductive layer 41, the equivalent electrical length of the second reflector 5 is equal to or slightly greater than one half of the wavelength of the second frequency band. In this case, constructive interference occurs in a direction between an electromagnetic wave induced by the second reflector 5 and the electromagnetic wave transmitted by the second element 22, so that a resultant total field is strengthened; and destructive interference occurs in another direction between the electromagnetic wave induced by the second reflector 5 and the electromagnetic wave transmitted by the second element 22, so that a resultant total field is weakened. It is equivalent to that the second reflector 5 reflects the electromagnetic wave transmitted by the second element 22, so as to enhance a gain of the directional antenna 10 in a reflection direction and improve communication quality.

When the selection switch 52 is opened, the reflection body 51 is disconnected from the conductive layer 41, that is, the state between the second reflector 5 and the conductive layer 41 is a disconnected state. When the electromagnetic wave transmitted by the second element 22 is transmitted to the second reflector 5, because the second reflector 5 is disconnected from the mirror image the second reflector 5 at the conductive layer 41, the second reflector 5 does not reflect the electromagnetic wave transmitted by the second element 22.

It can be learned that, in the directional antenna 10 shown in this embodiment, conduction and disconnection between the second reflector 5 and the conductive layer 41 may be controlled by the selection switch 52, so as to control, based on a specific requirement, whether the second reflector 5 reflects the electromagnetic wave transmitted by the second element 22 when the directional antenna 10 operates, and determine whether the directional antenna 10 generates an omni-directional beam or a directional beam within the second frequency band.

In this embodiment, there are two second reflectors 5, and the two second reflectors 5 are respectively located on left and right sides of the active element 2, and are symmetrical relative to the active element 2 in a radial direction. Specifically, the second reflector 5 on the left side is located between a second element 22 on the left side and a first reflector 3 on the left side, and the second reflector 5 on the right side is located between a second element 22 on the right side and a first reflector 3 on the right side. In a Y-axis direction, a distance D2 between the second reflector 5 on the left side and the second element 22 on the left side approximates $\lambda_2/4$, and a distance D2 between the second reflector 5 on the right side and the second element 22 on the right side approximates $\lambda_2/4$. $\lambda_2$ is the wavelength of the electromagnetic wave transmitted by the second element 22.

In an operating process of the directional antenna 10 shown in this embodiment, when selection switches 52 are disconnected, that is, both states between the two second reflectors 5 and the conductive layer 41 are in a disconnected state, the directional antenna 10 generates an omni-directional beam within the second frequency band. When the state between the second reflector 5 on the right side and the conductive layer 41 is a conducting state, constructive interference occurs, on a left side of the second element 22 on the right side, between an electromagnetic wave induced by the second reflector 5 on the right side and an electromagnetic wave transmitted by the second element 22 on the right side, so that a resultant total field is strengthened. Also, destructive interference occurs, on a right side of the second element 22 on the right side, between the electromagnetic wave induced by the second reflector 5 on the right side and the electromagnetic wave transmitted by the second element 22 on the right side, so that a resultant total field is weakened. That is, the second reflector 5 on the right side reflects, to the left side, the electromagnetic wave transmitted by the second element 22 on the right side. In this case, the directional antenna 10 generates a leftward directional beam within the second frequency band. When the state between the second reflector 5 on the left side and the conductive layer 41 is a conducting state, constructive interference occurs, on the right side of the second element 22 on the left side, between an electromagnetic wave induced by the second reflector 5 on the left side and an electromagnetic wave transmitted by the second element 22 on the left side, so that a resultant total field is strengthened. Also, destructive interference occurs, on the left side of the second element 22 on the left side, between the electromagnetic wave induced by the second reflector 5 on the left side and the electromagnetic wave transmitted by the second element 22 on the left side, so that a resultant total field is weakened, that is, the second reflector 5 on the left side reflects, to the right side, the electromagnetic wave transmitted by the second element 22 on the left side. In this case, the directional antenna 10 generates a rightward directional beam within the second frequency band. In this case, when the states between the second reflectors 5 on the two sides of the active element 2 and the conductive layer 41 are a conducting state, a beam of the directional antenna 10 within a first frequency band is not affected. Therefore, when the directional antenna 10 shown in this embodiment operates, conduction and disconnection between the two second reflectors 5 and the conductive layer 41 may be separately controlled based on a specific requirement, so as to determine a specific direction of a directional beam generated by the directional antenna 10 within the second frequency band.

What is claimed is:

1. A directional antenna, comprising an active element and a first reflector, wherein the active element comprises a first element and a second element, an operating frequency band of the first element is a first frequency band, and an operating frequency band of the second element is a second frequency band;

an equivalent electrical length of the first reflector is equal to or slightly greater than one half of a wavelength of the first frequency band; and the first reflector comprises a first resonant circuit, the first resonant circuit comprises a first capacitive part and a first inductive part that are connected in parallel, a resonance frequency of the first resonant circuit is within the second frequency band, and an equivalent electrical length of a part other than the first resonant circuit in the first reflector is less than one half of a wavelength of the second frequency band.

2. The directional antenna according to claim 1, wherein a minimum frequency of the second frequency band is greater than a maximum frequency of the first frequency band.

3. The directional antenna according to claim 1, wherein the active element further comprises a third element, an operating frequency band of the third element is a third frequency band, and the first reflector further comprises a second resonant circuit connected in series to the first resonant circuit; and the second resonant circuit comprises a second capacitive part and a second inductive part that are connected in parallel, and a resonance frequency of the second resonant circuit is within the third frequency band.

4. The directional antenna according to claim 1, wherein the first reflector further comprises a conductive part, the conductive part is connected in series to the first resonant circuit, and the equivalent electrical length of the first reflector minus an equivalent electrical length of the conductive part is less than one half of the wavelength of the first frequency band.

5. The directional antenna according to claim 1, wherein the antenna further comprises a second reflector, and an equivalent electrical length of the second reflector is equal to or slightly greater than one half of the wavelength of the second frequency band.

6. The directional antenna according to claim 1, wherein the antenna further comprises a mounting plate, the mounting plate comprises a first mounting surface, a first functional layer is disposed on the first mounting surface, and the active element is located within the first functional layer.

7. The directional antenna according to claim 6, wherein both the first capacitive part and the first inductive part are located within the first functional layer.

8. The directional antenna according to claim 6, wherein the mounting plate further comprises a second mounting surface opposite to the first mounting surface, a second functional layer is disposed on the second mounting surface, both the first capacitive part and the first inductive part are located within the second functional layer or the first capacitive part and the first inductive part are respectively located within the first functional layer and the second functional layer, and the first capacitive part and the first inductive part are disposed directly opposite to each other.

9. The directional antenna according to claim 6, wherein the directional antenna further comprises a floor, the floor comprises a bearing surface, the bearing surface bears the mounting plate, an included angle between the bearing surface and the first mounting surface is less than or equal to 90 degrees, a conductive layer is disposed on the bearing surface, and the conductive layer is electrically connected to the active element and the first reflector.

10. The directional antenna according to claim 9, wherein the first reflector further comprises a control switch, and the control switch is electrically connected between the first resonant circuit and the conductive layer; and when the control switch is closed, a sum of an electrical length of the first reflector and an electrical length of a mirror image of the first reflector at the conductive layer is equal to or slightly greater than one half of the wavelength of the first frequency band.

11. A communication device, comprising a radio frequency module and a directional antenna, wherein the radio frequency module is electrically connected to the active element of the directional antenna, and wherein the directional antenna comprises an active element and a first reflector, wherein the active element comprises a first element and a second element, an operating frequency band of the first element is a first frequency band, and an operating frequency band of the second element is a second frequency band;

an equivalent electrical length of the first reflector is equal to or slightly greater than one half of a wavelength of the first frequency band; and the first reflector comprises a first resonant circuit, the first resonant circuit comprises a first capacitive part and a first inductive part that are connected in parallel, a resonance frequency of the first resonant circuit is located within the second frequency band, and an equivalent electrical length of a part other than the first resonant circuit in the first reflector is less than one half of a wavelength of the second frequency band.

12. The communication device according to claim 11, wherein a minimum frequency of the second frequency band is greater than a maximum frequency of the first frequency band.

13. The communication device according to claim 11, wherein the active element further comprises a third element, an operating frequency band of the third element is a third frequency band, and the first reflector further comprises a second resonant circuit connected in series to the first resonant circuit; and the second resonant circuit comprises a second capacitive part and a second inductive part that are connected in parallel, and a resonance frequency of the second resonant circuit is within the third frequency band.

14. The communication device according to claim 11, wherein the first reflector further comprises a conductive part, the conductive part is connected in series to the first resonant circuit, and the equivalent electrical length of the first reflector minus an equivalent electrical length of the conductive part is less than one half of the wavelength of the first frequency band.

15. The communication device according to claim 11, wherein the antenna further comprises a second reflector, and an equivalent electrical length of the second reflector is equal to or slightly greater than one half of the wavelength of the second frequency band.

16. The communication device according to claim 11, wherein the antenna further comprises a mounting plate, the mounting plate comprises a first mounting surface, a first functional layer is disposed on the first mounting surface, and the active element is located within the first functional layer.

17. The communication device according to claim 16, wherein both the first capacitive part and the first inductive part are located within the first functional layer.

18. The communication device according to claim 16, wherein the mounting plate further comprises a second mounting surface opposite to the first mounting surface, a second functional layer is disposed on the second mounting surface, both the first capacitive part and the first inductive part are located within the second functional layer or the first capacitive part and the first inductive part are respectively located within the first functional layer and the second functional layer, and the first capacitive part and the first inductive part are disposed directly opposite to each other.

19. The communication device according to claim 16, wherein the directional antenna further comprises a floor, the floor comprises a bearing surface, the bearing surface bears the mounting plate, an included angle between the bearing surface and the first mounting surface is less than or equal to 90 degrees, a conductive layer is disposed on the bearing surface, and the conductive layer is electrically connected to the active element and the first reflector.

20. The communication device according to claim 19, wherein the first reflector further comprises a control switch, and the control switch is electrically connected between the first resonant circuit and the conductive layer; and when the control switch is closed, a sum of an electrical length of the first reflector and an electrical length of a mirror image of the first reflector at the conductive layer is equal to or slightly greater than one half of the wavelength of the first frequency band.

* * * * *